(12) United States Patent
Norwalk et al.

(10) Patent No.: US 9,423,881 B2
(45) Date of Patent: Aug. 23, 2016

(54) FOLDABLE KEYBOARD WITH ADJUSTABLE ERGONOMIC FEATURES

(71) Applicant: Key Ovation, LLC, Cedar Park, TX (US)

(72) Inventors: Mark Norwalk, Austin, TX (US); Chris Linegar, Sydney (AU)

(73) Assignee: Key Ovation, LLC, Cedar Park, TX (US)

( * ) Notice: Subject to any disclaimer, the term of this patent is extended or adjusted under 35 U.S.C. 154(b) by 225 days.

(21) Appl. No.: 13/940,046

(22) Filed: Jul. 11, 2013

(65) Prior Publication Data

US 2014/0240235 A1 Aug. 28, 2014

Related U.S. Application Data

(60) Provisional application No. 61/770,035, filed on Feb. 27, 2013, provisional application No. 61/829,040, filed on May 30, 2013.

(51) Int. Cl.
*G06F 3/02* (2006.01)

(52) U.S. Cl.
CPC ........... *G06F 3/0216* (2013.01); *G06F 3/0202* (2013.01); *G06F 3/0221* (2013.01)

(58) Field of Classification Search
CPC .............................. G06F 3/0221; G06F 3/0208
See application file for complete search history.

(56) References Cited

U.S. PATENT DOCUMENTS

| | | | |
|---|---|---|---|
| 5,416,730 A * | 5/1995 | Lookofsky | G06F 1/163 |
| | | | 361/679.02 |
| 5,574,481 A * | 11/1996 | Lee | 345/168 |
| 6,773,179 B2 * | 8/2004 | Huang et al. | 400/472 |
| 7,503,713 B2 * | 3/2009 | Large | G06F 3/0216 |
| | | | 400/472 |
| 8,902,167 B2 * | 12/2014 | Linegar et al. | 345/168 |
| 2004/0104897 A1* | 6/2004 | Mochizuki et al. | 345/168 |
| 2004/0203513 A1 | 10/2004 | Kwon | |
| 2005/0002158 A1 | 1/2005 | Olodort et al. | |
| 2007/0285395 A1 | 12/2007 | Hargreaves et al. | |
| 2008/0253822 A1 | 10/2008 | Matias | |
| 2012/0170198 A1* | 7/2012 | Wu | G06F 3/0221 |
| | | | 361/679.15 |
| 2012/0262867 A1 | 10/2012 | Liu et al. | |
| 2013/0242488 A1* | 9/2013 | Chen | 361/679.2 |

FOREIGN PATENT DOCUMENTS

| | | | |
|---|---|---|---|
| CN | 101034311 A | * | 9/2007 |
| JP | 04365115 A | * | 12/1992 |
| KR | 10-0800769 B1 | | 1/2008 |
| WO | WO 98-43156 A1 | | 10/1998 |

* cited by examiner

*Primary Examiner* — Daniel J Colilla

(57) ABSTRACT

An input system includes a first base portion including a keying surface and a second base portion including a keying surface. For example, the input system may be a keyboard with a first keyboard segment and a second keyboard segment. A base portion manipulation mechanism couples the first base portion to the second base portion. The base portion manipulation mechanism includes a first moveable coupling that is configured to allow relative movement of the first base portion and the second base portion into at least one of a side-by-side tented orientation and a side-by-side splayed orientation. For example, the first base portion and the second base portion may be moved into an ergonomic, side-by-side, tented and splayed orientation. A second moveable coupling is configured to allow relative movement of the first base portion and the second base portion into a stacked orientation for storage and travel.

34 Claims, 18 Drawing Sheets

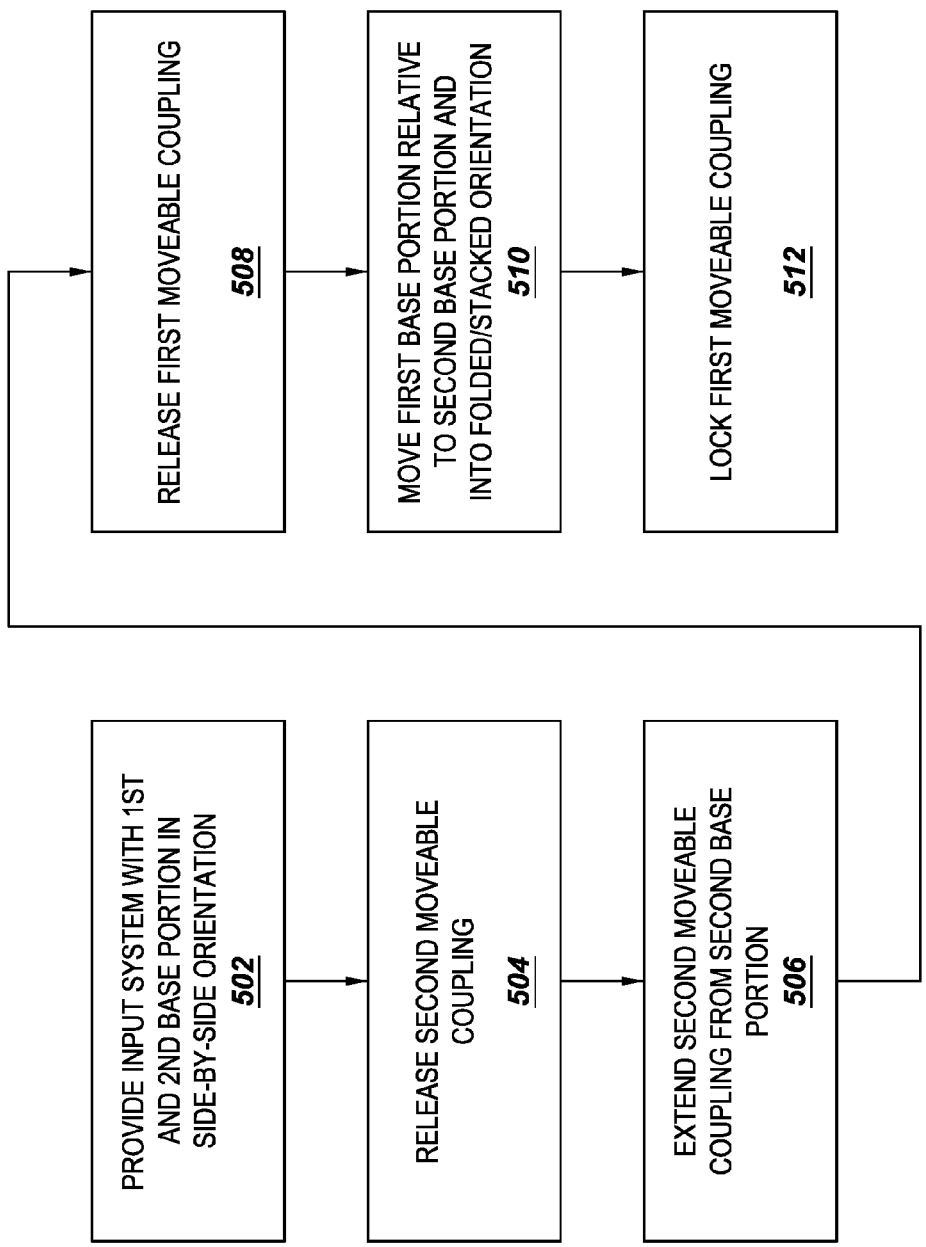

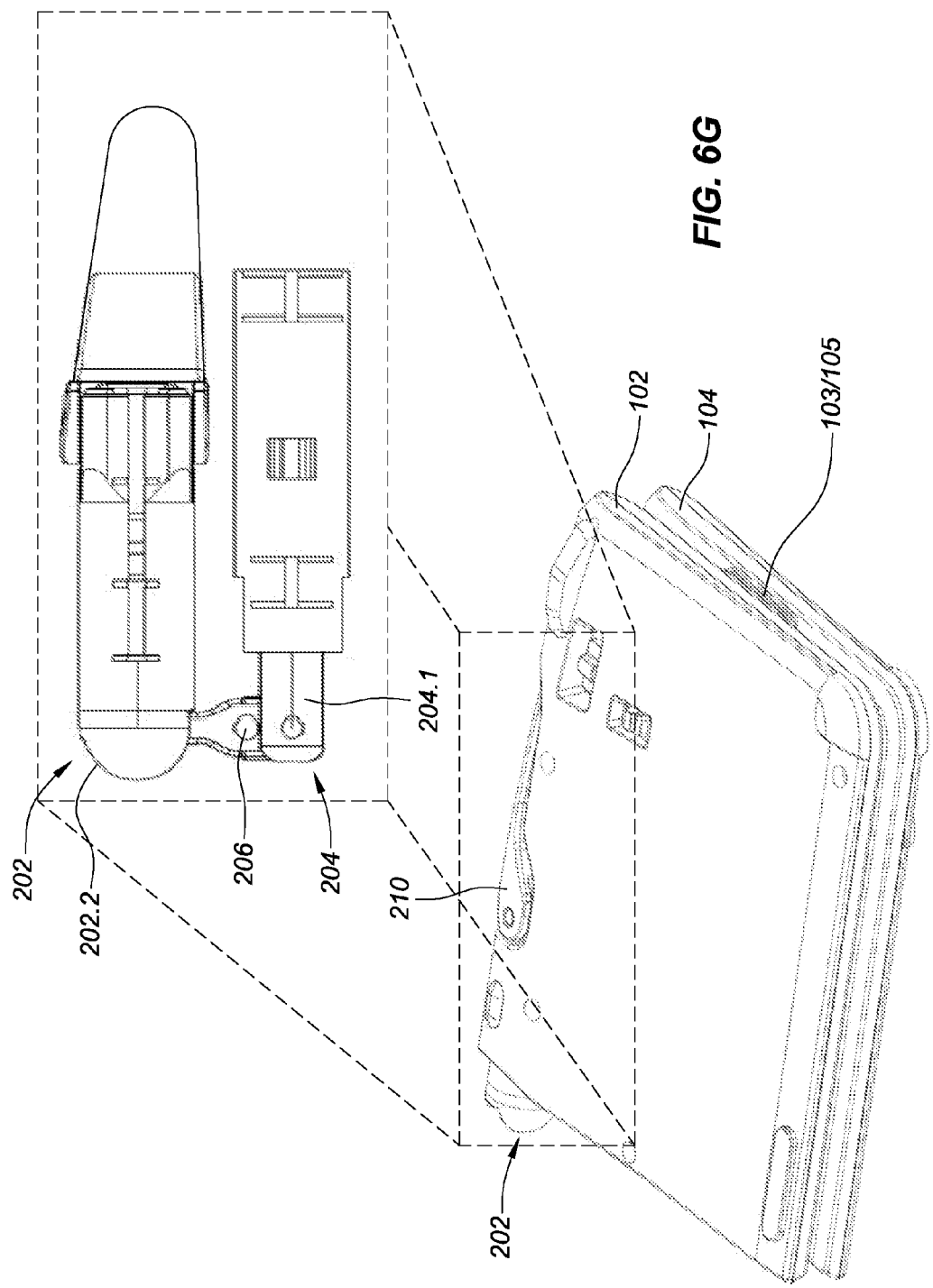

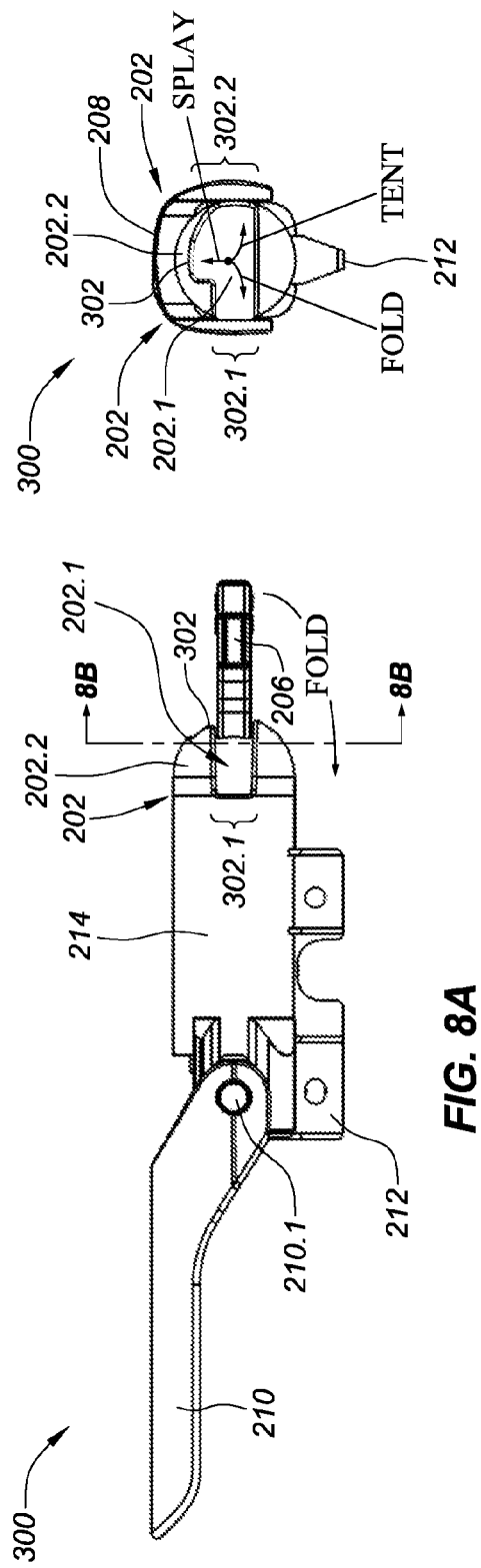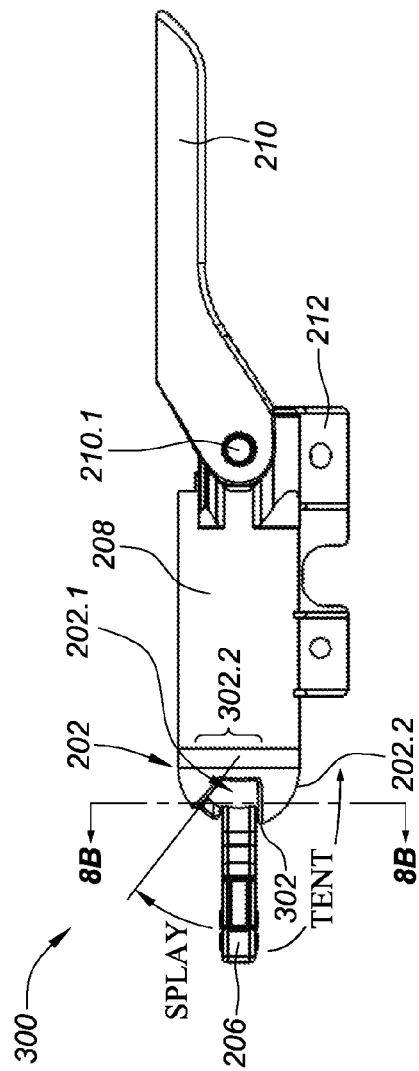

FOLDABLE KEYBOARD WITH ADJUSTABLE ERGONOMIC FEATURES

CROSS REFERENCE TO RELATED APPLICATIONS

The present patent application claims priority to (1) U.S. Provisional Patent Application Ser. No. 61/770,035, filed on Feb. 27, 2013, and (2) U.S. Provisional Patent Application Ser. No. 61/829,040, filed on May 30, 2013, the entire disclosures of which are incorporated herein by reference.

BACKGROUND

The present disclosure relates generally to computer input systems, and in more particular embodiments to a keyboard that may be adjusted to both provide the keyboard in a variety of ergonomic orientations and to provide the keyboard in a compact, folded-over configuration for stowing and transport.

Keyboards of the type used at computer terminals conventionally include a unitary board onto which alphanumeric keys are attached. It is often a disadvantage of such conventional keyboards that the wrists and/or arms and shoulders of a human user must be contorted into a configuration which may be stressful, particularly after prolonged use of the keyboard. This problem is brought about by the fact that, in most conventional unitary keyboard designs and key arrangements, the hands of the user must be turned outwardly by pivoting of the wrists relative to the forearms, resulting in ulnar deviation. Discomfort to the user caused by pronation of the wrists is also a problem with these conventional keyboards. Pronated postures can also transmit stresses into the neck and shoulders of the user.

It is generally desirable to reduce pronation and ulnar deviation of the wrists in computer keyboards. To that end, U.S. Pat. No. 6,984,081 describes adjustable keyboards with at least two segments which are movable relative to one another via a hinge or joint. By moving the segments, the orientation of the users wrists and hands can be adjusted to allow for reduction of ulnar deviation and pronation of the wrists. Successful commercial embodiments generally in accord with such a design include the Goldtouch adjustable keyboard and the Goldtouch Go!™ travel keyboard, both available from KeyOvation, LLC, Cedar Park, Tex.

Unfortunately, while adjustable ergonomic keyboards such as the aforementioned Goldtouch keyboard (and even some competing designs) may provide desktop users with practical options to reduce pronation and/or ulnar deviation that may otherwise be associated with use of conventional unitary detached keyboards, users of portable computing devices (including laptop-, notebook- or netbook-type computers), and particularly those users for whom travel-friendly, compact form factors are desirable, have much more limited options. Accordingly, improved travel-friendly, ergonomic keyboard solutions are desired.

SUMMARY

It has been discovered that an ergonomic keyboard that allows keyboard segments to be adjusted, such as in tented and/or splayed configurations to reduce pronation and/or ulnar deviation in a given user's interaction therewith, may adapted to further allow a compact folded-over configuration of the keyboard segments. Such a configuration may be desirable for travel or compact storage. Specifically, it has been discovered that a fold-over, dual-joint hinge mechanism with a spaced-apart pair of rotational couplings may be used to mechanically couple the keyboard segments. A lockable ball-and-socket-joint-type rotational coupling provides multiple rotational degrees of freedom and allows the keyboard sections to be adjustably tented and/or splayed to positions suitable or ergonomically desirable for particular users. A second rotational coupling, e.g., a hinge, which is typically immobilized to facilitate tenting and/or splaying adjustments, may be released to provide, together with the ball-and-socket joint, 180° rotational freedom and spacing control to allow keyboard sections to fold, one over the other, for travel or compact storage.

Using keyboard designs described herein, information technology (IT) departments may provide their mobile workforces with the adjustable ergonomic features favored by corporate health and safety programs as well as by insurers, while recognizing the practical, real-world, form factor constraints that affect "road warriors," sales professionals and other frequent business travelers. Such keyboard designs may, in some embodiments, be folded for travel in compact clamshell configurations in which keyboard segments enclose and protect keys from damage. Upon arrival, the user may simply (i) unfold the clamshell, (ii) stow and thereby immobilize one rotational coupling of the fold-over, dual-joint hinge mechanism, (iii) adjust the other rotational coupling, and (iv) lock the keyboard segments in a suitable tented and/or splayed position for use.

In some embodiments in accordance with the present disclosure, a keyboard includes a first keyboard segment and a second keyboard segment, wherein each of the first keyboard segment and the second keyboard segment includes a keying surface; and a fold-over, dual-joint mechanism coupling the first keyboard segment to the second keyboard segment, the fold-over dual-joint mechanism including a first rotational coupling providing multiple rotational degrees of freedom and a second rotational coupling that is substantially immobilized when in a stowed position within the first keyboard segment.

In some embodiments, at least one tented orientation, at least one splayed orientation, and at least one tented and splayed orientation of the first and second keyboard segments is accommodated using the first rotational coupling, and the first rotational coupling is frictionally lockable in the at least one tented orientation, the at least one splayed orientation, and at least one tented and splayed orientation.

In some embodiments, the at least one tented orientation, the at least one splayed orientation, and the at least one tented and splayed orientation of the first and second keyboard segments and the frictional locking in the at least one tented orientation, the at least one splayed orientation, and the at least one tented and splayed orientation are accommodated with the second rotational coupling in the stowed position.

In some embodiments, the first rotational coupling includes a ball and a socket and at least one of the ball and the socket is dimpled to increase static friction between the ball and the socket to provide the frictional locking.

In some embodiments, the keyboard includes a latch that is configured to retain the second rotational coupling in the stowed position, wherein upon release of the latch, the second rotational coupling is configured to travel out of the first keyboard segment and into an extended position that allows the second rotational coupling to rotate to provide the first keyboard segment folded over the second keyboard segment in a folded orientation.

In some embodiments, the latch is configured to retain the second rotational coupling in each of the stowed position and the extended position.

In some embodiments, a catch system including a first catch portion located on the first keyboard segment and a second catch portion located on the second keyboard segment, wherein the first catch portion and the second catch portion are configured to retain the first keyboard segment and the second keyboard segment in a folded orientation.

In some embodiments, the first keyboard segment and the second keyboard segment in the folded orientation provide a clamshell configuration to protect the keying surface on each of the first keyboard segment and the second keyboard segment.

In some embodiments, the keyboard includes a mating surface defined on each of the first keyboard segment and the second keyboard segment, wherein the keying surface on each of the first keyboard segment and the second keyboard segment does not extend past the mating surfaces such that no input events are generated in the folded orientation.

In some embodiments, the fold-over, dual-joint mechanism is configured to allow the first keyboard segment to pivot approximately 180 degrees relative to the second keyboard segment from (i) a first position in which the keying surface on each of the first keyboard segment and the second keyboard segment are presented to a human user as an operable keyboard to (ii) a second position in which the keying surface on each of the first keyboard segment and the second keyboard segment are protected by a clamshell configuration provided by the first keyboard segment folded over the second keyboard segment.

In some embodiments, the pivoting of the first keyboard segment relative to the second keyboard segment from the first position to the second position constrains movement of both the first rotational coupling and the second rotational coupling to a single rotational plane.

In some embodiments, the multiple rotational degrees of freedom provided by the first rotational coupling allow further pivoting in directions that are unconstrained to the single rotational plane and include pivoting of the first keyboard segment and second keyboard segment from a flat orientation to a fully tented orientation, and include pivoting of the first keyboard segment and the second keyboard segment from an unsplayed orientation to a fully splayed orientation.

In some embodiments, the first rotational coupling includes a ball and a socket, and a shaped window is defined in the socket that is configured to constrain the movement of the ball to the single rotational plane and constrain the multiple rotational degrees of freedom to limits associated with the fully tented orientation and the fully splayed orientation.

In some embodiments, a tenting range of motion provided between the flat orientation and the fully tented orientation of the first keyboard segment and the second keyboard segment is approximately 40 degrees.

In some embodiments, a splaying range of motion provided between the unsplayed orientation and the fully splayed orientation of the first keyboard segment and the second keyboard segment is approximately 20 degrees.

In some embodiments, the first rotational coupling includes a ball and a socket, and the keyboard further includes a releasable biasing mechanism that is configured to urge the ball against the socket and frictionally impede rotation of the ball relative to the socket.

In some embodiments, the releasable biasing mechanism includes a handle and a cam that are configured, when in a locked orientation, to provide the urging of the ball against the socket, and when in an unlocked orientation, to release frictional engagement of the ball and the socket.

In some embodiments, the fold-over, dual-joint mechanism includes the first rotational coupling spaced apart from the second rotational coupling to provide a spaced apart pair of rotational couplings.

In some embodiments, the first rotational coupling includes a ball and socket joint. In some embodiments, the second rotational coupling includes a hinge.

In some embodiments, the first keyboard segment includes a body portion defining a channel. In some embodiments, the second rotational coupling is substantially immobilized when in the stowed position that is within the channel defined by the body portion of the first keyboard segment.

In some embodiments in accordance with the present disclosure, an input system includes a first base portion including a keying surface; a second base portion including a keying surface; and a base portion manipulation mechanism coupling the first base portion to the second base portion, wherein the base portion manipulation mechanism includes: a first moveable coupling that is configured to allow relative movement of the first base portion and the second base portion into at least one of a side-by-side tented orientation and a side-by-side splayed orientation; and a second moveable coupling that is configured to allow relative movement of the first base portion and the second base portion into a stacked orientation.

In some embodiments, each of the keying surface on the first base portion and the keying surface on the second base portion include at least one of: a plurality of physical keys, a virtual keying surface that is operable to display a plurality of virtual keys, and a touch screen.

In some embodiments, the first moveable coupling includes a ball and a socket that are configured, with the first base portion and the second base portion positioned side-by-side, to allow relative movement of the first base portion and the second base portion about a tenting axis and into the side-by-side tented orientation, and to allow relative movement of the first base portion and the second base portion about a splaying axis and into the side-by-side splayed orientation.

In some embodiments, the second moveable coupling includes a hinge that is configured to allow relative movement of the first base portion and the second base portion about a stacking axis and into the stacked orientation.

In some embodiments, the hinge is configured to allow relative movement of the first base portion and the second base portion about a first stacking axis; the first moveable coupling is configured to allow relative movement the first base portion and the second base portion about a second stacking axis; and relative movement of the first base portion and the second base portion about the first stacking axis and the second stacking axis moves the first base portion and the second base portion into the stacked orientation.

In some embodiments the input device further includes a first moveable coupling locking mechanism that is configured to resist movement of first moveable coupling to prevent relative movement of the first base portion and the second base portion out of the at least one of the side-by-side tented orientation and the side-by-side splayed orientation.

In some embodiments, the second moveable coupling is configured to be immobilized to resist relative movement of the first base portion and the second base portion into the stacked orientation.

In some embodiments, the second moveable coupling is configured to be immobilized by moving the second moveable coupling into a stowed position such that the second moveable coupling is located in a channel defined by one of the first base portion and the second base portion, and wherein the second moveable coupling is configured to be mobilized by moving the second moveable coupling into an extended position such that the second moveable coupling is located out of the channel.

In some embodiments, the input device further includes a second moveable coupling locking mechanism that is configured to resist movement of the second rotational coupling relative to the channel when the second moveable coupling is in at least one of the stowed position and the extended position.

In some embodiments, the input device further includes a stacked orientation securing mechanism that is configured to resist relative movement of the first base portion and the second base portion out of the stacked orientation.

In some embodiments, the input device further includes a mating surface on each of the first base portion and the second base portion that are configured, when the first base position and the second base portion are in the stacked orientation, to prevent activation of the keying surface on each of the first base portion and the second base portion.

In some embodiments, the first moveable coupling allows a plurality of side-by-side tenting orientations of the first base portion and the second base portion that provide a tenting range of motion of approximately 40 degrees.

In some embodiments, the first moveable coupling allows a plurality of side-by-side splayed orientations of the first base portion and the second base portion that provide a splaying range of motion of approximately 20 degrees.

In some embodiments, the keying surface included on the first base portion is provided on a first base portion surface and the keying surface included on the second base portion is provided on a second base portion surface; and the first base portion surface is located immediately adjacent and facing the second base portion surface when the first base portion and the second base portion are in the stacked orientation.

In some embodiments in accordance with the present disclosure, a method for providing an input system includes providing a first keying surface base portion coupled to a second keying surface base portion by a base portion manipulation mechanism that includes a first moveable coupling and a second moveable coupling; moving the first keying surface base portion relative to the second keying surface base portion about the second moveable coupling and between a stacked orientation and a side-by-side orientation; and moving the first keying surface base portion relative to the second keying surface base portion about the first moveable coupling and between the side-by-side orientation and at least one of a side-by-side tented orientation and a side-by-side splayed orientation.

In some embodiments, the moving the first keying surface base portion relative to the second keying surface base portion between the stacked orientation and the side-by-side orientation includes: moving the first keying surface base portion relative to the second keying surface base portion about a first stacking axis provided by the second moveable coupling; and moving the first keying surface base portion relative to the second keying surface base portion about a second stacking axis provided by the first moveable coupling; wherein relative movement of the first base portion and the second base portion about the first stacking axis and the second stacking axis moves the first base portion and the second base portion between the stacked orientation and the side-by-side orientation.

In some embodiments, the method further includes resisting movement of the first moveable coupling to prevent relative movement of the first keying surface base portion and the second keying surface base portion out of the at least one of the side-by-side tented orientation and the side-by-side splayed orientation.

In some embodiments, the method further includes immobilizing the second moveable coupling to resist relative movement of the first keying surface base portion and the second keying surface base portion from the side-by-side orientation to the stacked orientation.

In some embodiments, the immobilizing includes moving the second moveable coupling into a stowed position such that the second moveable coupling is located in a channel defined by one of the first keying surface base portion and the second keying surface base portion, and the method further comprises: mobilizing the second moveable coupling by moving the second moveable coupling into an extended position such that the second moveable coupling is located out of the channel.

In some embodiments, the method further includes resisting movement of the second rotational coupling relative to the channel when the second moveable coupling is in at least one of the stowed position and the extended position.

In some embodiments, the method further includes resisting relative movement of the first keying surface base portion and the second keying surface base portion out of the stacked orientation.

In some embodiments, the method further includes preventing activation of at least one keying surface on each of the first keying surface base portion and the second keying surface base portion when the first keying surface base portion and the second keying surface base portion are in the stacked orientation.

In some embodiments, the first moveable coupling allows a plurality of side-by-side tenting orientations of the first keying surface base portion and the second keying surface base portion that provide a tenting range of motion of approximately 40 degrees; and the first moveable coupling allows a plurality of side-by-side splayed orientations of the first keying surface base portion and the second keying surface base portion that provide a splaying range of motion of approximately 20 degrees.

BRIEF DESCRIPTION OF THE DRAWINGS

FIG. 5 is a flow chart illustrating an embodiment of a method for providing a keyboard input system.

FIG. 6G is a perspective view illustrating an embodiment of the keyboard input system of FIGS. 1 and 2 with the first and second portions locked in a folded or stacked orientation.

FIG. 8A is a side view illustrating an embodiment of a socket window on the manipulation mechanism used with the keyboard input system of FIGS. 1 and 2.

FIG. 8B is a perspective view illustrating an embodiment of the socket window on the manipulation mechanism of FIG. 8A.

FIG. 8C is a side view illustrating an embodiment of the socket window on the manipulation mechanism of FIGS. 8A and 8B.

DETAILED DESCRIPTION

There is disclosed herein a keyboard having keying surfaces including a plurality of keys, the keyboard having at least two segments that are mutually movable relative to one another, and wherein each segment of the keyboard presents a user with keys on its respective keying surface. Typically, the keyboard has at least two mutually pivotable segments which are attached to one another at a top end of the keyboard segments by way of a hinge or joint, such that a front edge of the keyboard may spread apart or "splay" in at least a substantially horizontal plane, to thereby reduce ulnar deviation in the keyboard user. Advantageously, the hinge or joint is adapted to allow pivoting in both horizontal and vertical planes such that the two segments of the keyboard may reside in different planes, so that the center of the keyboard is raised to reduce pronation and therefore decrease tension in the wrists and forearms of the user.

The hinge or joint may preferably be composed of a ball and socket joint which includes a locking mechanism. The locking mechanism can include a button, lever or other actuator operable on either of the segments or at the joint itself, to selectively free and lock the joint. In a particular embodiment, the locking mechanism may be fashioned using a pivoting handle, in the form of a lever, which includes a cam. The cam may be used to force bearing surfaces against a ball joint element, to thereby frictionally retain a ball and socket joint in a selected fixed position. Upon pivoting of the handle away from the keyboard, the cam may release the ball from the friction fit with the bearing surfaces, thereby allowing the ball to slide in the socket, and therefore allowing the keyboard segments to be adjusted relative to one another.

In addition to the foregoing ergonomic features, a further fold-over, dual-joint, hinge mechanism and operation thereof are detailed herein and will be understood by persons of ordinary skill in the art having benefit of the present description. In general, embodiments of the present invention(s) may be better understood, and its numerous objects, features, and advantages made apparent to those skilled in the art by referencing the accompanying drawings. The use of the same reference symbols in different drawings indicates similar or identical items.

Figure 1:
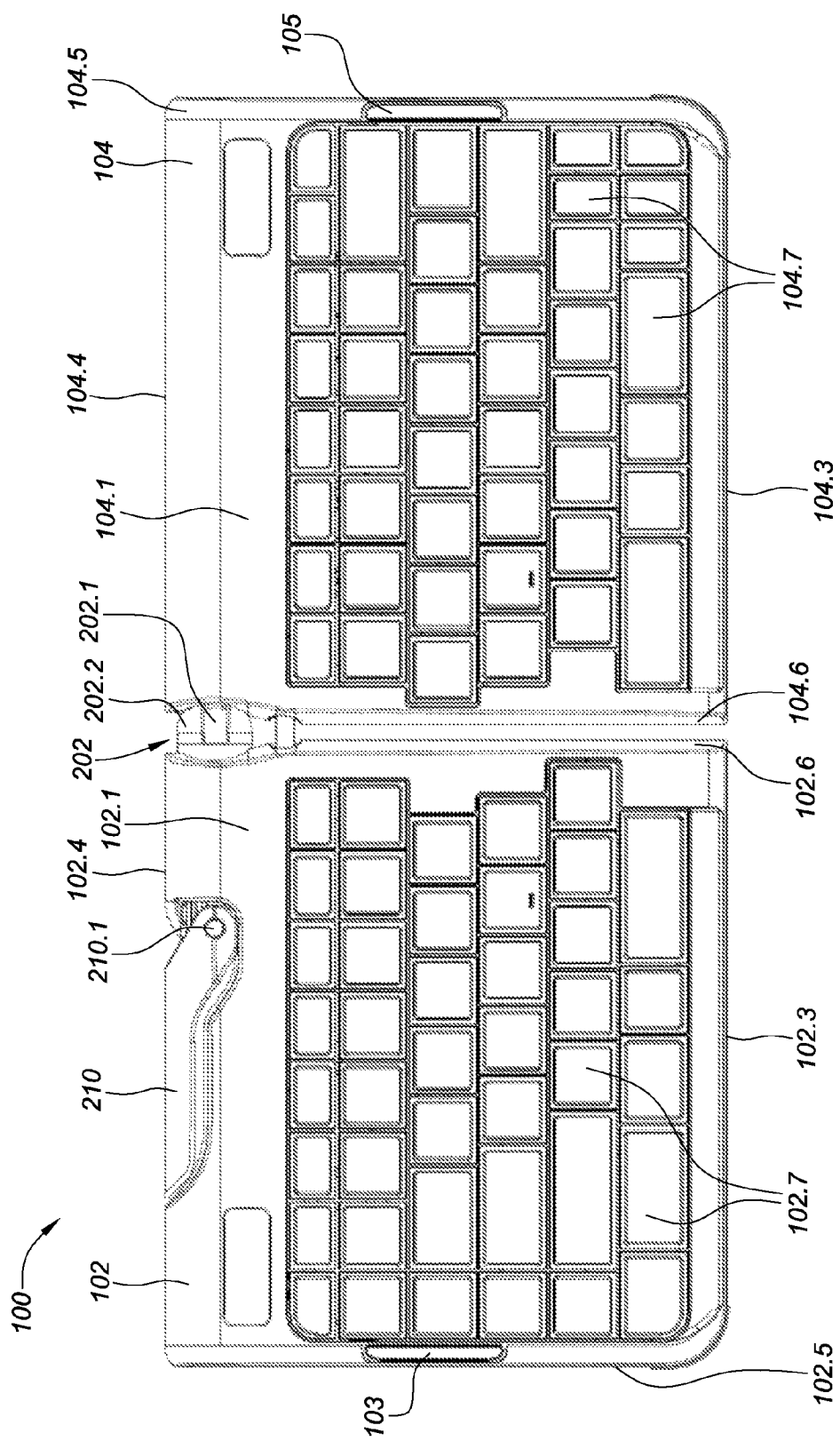
FIG. 1 is a top view illustrating an embodiment of a keyboard input system including a first portion coupled to a second portion by a manipulation mechanism.
Figure 2:
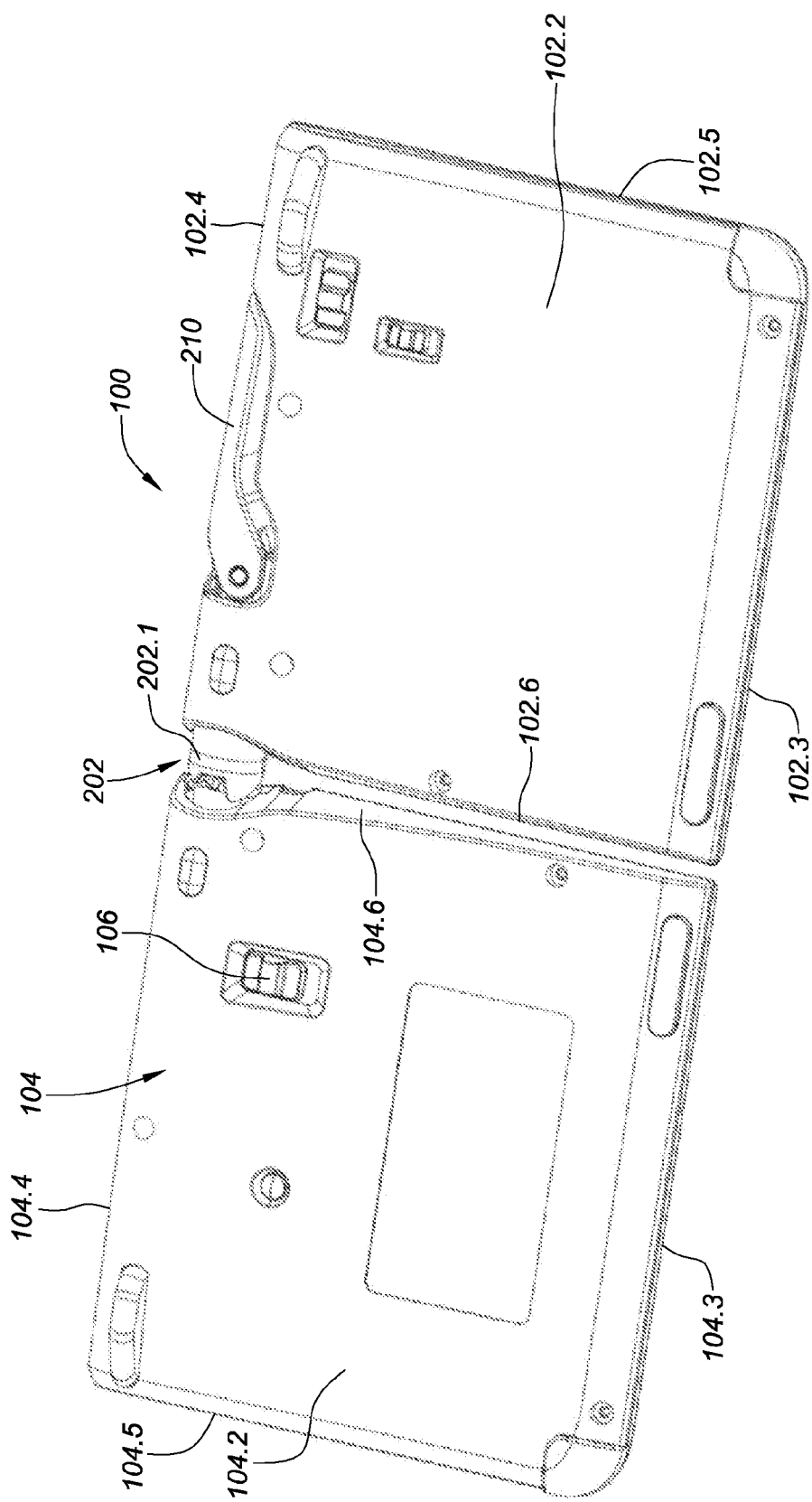
FIG. 2 is a bottom view illustrating an embodiment of the keyboard input system of FIG. 1.

Referring now to FIGS. 1 and 2, an embodiment of an adjustable ergonomic input system 100 is illustrated. The input system 100 includes a first base portion 102 and a second base portion 104. The first base portion 102 includes a top surface 102.1, a bottom surface 102.2 that is located opposite the first base portion 102 from the top surface 102.1, a front edge 102.3 extending between the top surface 102a and the bottom surface 102.2, a rear edge 102.4 located opposite the first base portion 102 from the front edge 102.3 and extending between the top surface 102a and the bottom surface 102.2, an outer side edge 102.5 extending between the top surface 102a, the bottom surface 102.2, the front edge 102.3, and the rear edge 102.4, and an inner side edge 102.6 located opposite the first base portion 102 from the outer side edge 102.5 and extending between the top surface 102a, the bottom surface 102.2, the front edge 102.3, and the rear edge 102.4.

The first base portion 102 includes one or more mating surfaces such as, for example, a mating surface 103 that is located on the top surface 102.1, immediately adjacent the outer side edge 102.5 and approximately midway between the front edge 102.3 and the rear edge 102.4. The feature on the first base portion 102 that provides the mating surface 104 may be dimensioned such that none of the input device(s) on the first base portion 102 extend past the mating surface 103 to ensure that input device events are not generated (e.g., keys are not depressed) when the first base portion 102 and the second base portion 104 are in a folded or stacked orientation, discussed in further detail below. In an embodiment, the mating surface 103 may be part of a folded/stacked orientation securing system used to secure the first base portion 102 to the second base portion 104 when in a folded or stacked orientation, discussed in further detail below. When used as part of a folded/stacked orientation securing system, the mating surface 103 may be part of a latch that includes latching features, a magnet, and/or a variety of other catch system elements known in the art.

The second base portion 104 includes a top surface 104.1, a bottom surface 104.2 that is located opposite the second base portion 104 from the top surface 104.1, a front edge 104.3 extending between the top surface 104.1 and the bottom surface 104.2, a rear edge 104.4 located opposite the second base portion 104 from the front edge 104.3 and extending between the top surface 104.1 and the bottom surface 104.2, an outer side edge 104.5 extending between the top surface 104.1, the bottom surface 104.2, the front edge 104.3, and the rear edge 104.4, and an inner side edge 104.6 located opposite the second base portion 104 from the outer side edge 104.5 and extending between the top surface 104.1, the bottom surface 104.2, the front edge 104.3, and the rear edge 104.4. The second base portion 104 includes a second moveable coupling lock release member 106 on the bottom surface 104.2, discussed in further detail below.

The second base portion 104 includes one or more mating surfaces such as, for example, a mating surface 105 that is located on the top surface 104.1, immediately adjacent the outer side edge 104.5 and approximately midway between the front edge 104.3 and the rear edge 104.4. The feature on the second base portion 104 that provides the mating surface 105 may be dimensioned such that none of the keying surfaces on the second base portion 104 extend past the mating surface 105 to ensure that input events are not generated (e.g., keys are not depressed) when the first base portion 102 and the second base portion 104 are in a folded or stacked orientation, discussed in further detail below. In an embodiment, the mating surface 105 may be part of a folded/stacked orientation securing system used to secure the first base portion 102 to the second base portion 104 when in the folded or stacked orientation, discussed in further detail below. When used as part of a folded/stacked orientation securing system, the mating surface 105 may be part of a latch that includes latching features, a magnet, and/or a variety of other catch system elements known in the art Each of the first base portion 102 and the second base portion 104 include at least one input device 102.7 and 104.7, respectively, that provides a keying surface. In the illustrated embodiment, the input system 100 is a keyboard input system including a left-side keyboard segment as the first base portion 102 and a right-side keyboard segment as the second base portion 104, with each keyboard segment including a plurality of physical keys as the input devices 102.7 and 104.7, respectively, provided on their top surfaces 102.1 and 104.1, respectively. However, the base portions 102 and 104 on the input system 100 may include a variety of other keying surface input devices in addition to, or in place of, the physical keys, and at additional or different locations other than the top surfaces 102.1 and 104.1. For example, either or both of the first base portion 110 and second base portion 120 may include a touch sensitive device or display that allows a user to provide keying inputs by touch (e.g., gestures, "taps", and/or other touch inputs known in the art), that displays a virtual keyboard or keying surface including one or more virtual keys selectable by the user, and/or that provides any other touch input functionality known in the art. Furthermore, the location of input device(s) on the base portions 102 and 104 may include any or all of their top surface, bottom surface, front edge, rear edge, or side edges. As such, while the illustrated embodiments discussed below are directed to physical key input devices located on a top surface of each of the base portions 102 and 104, other embodiments of the present disclosure should not be limited by the types or locations of input devices provided on the base portions 102 and 104 of the input system 100.

Referring to FIGS. 1, 2, 7A, 7B, 7C, and 7D, an embodiment of a base portion manipulation mechanism 200 is illustrated that couples the first base portion 110 to the second base portion 120. The base portion manipulation mechanism 200 includes a first moveable coupling 202 that is configured to provide the first base portion 102 and the second base portion 104 in a tented orientation, a splayed orientation, or a tented and splayed orientation, discussed in further detail below, and a second moveable coupling 204 that is configured to provide the first base portion 102 and the second base portion 104 in a folded or stacked orientation, discussed in further detail below. In the illustrated embodiment, the first moveable coupling 202 and the second moveable coupling 204 are provided on the base portion manipulation mechanism 200 in a spaced-apart orientation from each other by a link 206 that connects the first moveable coupling 202 and the second moveable coupling 204.

For example, in the illustrated embodiment, the first moveable coupling 202 is a rotational coupling that includes a ball 202.1 and a socket 202.2, and the link 206 extends from the ball. Furthermore, the second moveable coupling 204 is also a rotational coupling that includes a pivotal connector 204.1 that connects to an end of the link 206 that is opposite the ball 202.1 to provide a hinge coupling. However, while a specific example of a base portion manipulation mechanism including spaced-apart rotational couplings (e.g., the ball/socket and hinge) is illustrated and described below, one of skill in the art in possession of the present disclosure would recognize that the base portion manipulation mechanism may include a moveable coupling or moveable couplings that are not illustrated but that could be used to provide the tented orientation, splayed orientation, and/or folded/stacked orientation discussed below without departing from the scope of the present disclosure.

The base portion manipulation mechanism 200 also includes a first moveable coupling locking system that, in the illustrated embodiment, includes a locking housing 208 and a locking actuator 210 that is pivotally coupled to the locking housing 208 about an axis 210.1. The locking actuator 210 includes a cam surface 210.2 that is configured to engage a locking piston 208.1 that is housed in the locking housing 208. A frictional member 208.2 is positioned in the locking housing 208 between the locking piston 208.1 and the ball 202.1. As can be seen in FIGS. 1 and 2, along with the phantom lines in FIGS. 7A-7D, the section of the base portion manipulation mechanism 200 that includes the first moveable coupling locking system is located in the first base portion 102 and includes features such as a mounting bracket 212 to secure that section to the first base portion 102.

While a specific example of a first moveable coupling locking system has been provided, one of skill in the art will recognize that a variety of different locking mechanisms for securing the first base portion 102 and the second base portion 104 in the tented orientations and/or the splayed orientations, discussed below, will fall within the scope of the present disclosure. For example, at least one of the ball 202.1 and the socket 202.2 may be dimpled, with the non-dimpled one of the ball 202.1 and the socket 202.2 including protrusions that engage the dimples to increase the static friction between the ball 202.1 and the socket 202.2 to provide the frictional locking of the ball 202.1 and the socket 202.2, discussed below. In another example, springs or other biasing devices may be used to bias the ball 202.1 and the socket 202.2 into engagement such that the static friction increasing features (e.g., the dimples and protrusions discussed above) on the ball 202.1 and/or socket 202.2 are engaged to increase static friction and resist movement of the ball 202.1 relative to the socket 202.2 such that the input device 100 remains in a desired tented and/or splayed orientation.

In some embodiments, static friction increasing features and biasing devices incorporated into or with the ball 202.1 and socket 202.2 mechanism may allow for removal of the latch 210 and associated mechanisms used to lock the input device 100 in a tented and/or splayed orientation. For example, using an embodiment of the input device 100 with a spring biased ball 202.1 and socket 202.2 mechanism that includes the dimples and protrusions discussed above, adjustment of the input device 100 from an untented and unsplayed orientation to a tented and/or splayed orientation may include any or all of (1) a user providing a force that opposes the spring biasing force (e.g., by grasping each of the first base portion 102 and the second base portion 104 and pulling them away from each other) in order to disengage the ball 202.1 from the socket 202.2 (and thus the dimples from the protrusions), (2) the user orienting the first base portion 102 and the second base portion 104 into a desired tented and/or splayed orientation, and (3) the user ceasing to provide the force that opposes the spring biasing force such that the spring biases the ball 202.1 back into engagement with the socket 202.2 (and thus the dimples with the protrusions) such that the input device 100 is locked in the desired tented and/or splayed orientation. Any readjustment of the input device from that desired tented and/or splayed orientation may then be accomplished by repeating the steps above.

The base portion manipulation mechanism 200 also includes a second moveable coupling stowing system that, in the illustrated embodiment, includes a stowing housing 214 that defines a channel 214a. The pivotal connector 204 of the second rotational coupling 204 extends from a base 216 that is moveably coupled to the stowing housing 214 such that pivotal connector 204 and at least a portion of the base 216 are configured to move in and out of the channel 214a. The base 216 includes a pair of spaced-apart locking aperture 216.1 and 216.2. A locking system 217 for the second moveable coupling stowing system includes a locking member 217.1 that is biased (e.g., using a spring or other biasing member) into a position in one of the locking apertures 216.1 and 216.2 depending on the position of the base 216 in the stowing housing 214/channel 214a. As can be seen in FIGS. 1 and 2, along with the phantom lines in FIGS. 7A-7D, the section of the base portion manipulation mechanism 200 that includes the second moveable coupling stowing system is located in the second base portion 104 and includes features such as a mounting bracket 218 to secure that section to the second base portion 104. With the second moveable coupling stowing system located in the second base portion 104, the locking system 217 is coupled to the second moveable coupling lock release member 106 on the second base portion 106 to allow actuation of the locking member 217.1, discussed in further detail below. While a specific example of a second moveable coupling stowing system has been provided, one of skill in the art will recognize that a variety of different stowing mechanisms for stowing the second moveable coupling, discussed below, will fall within the scope of the present disclosure. Furthermore, in some embodiments, the second moveable coupling may not be stowed, and thus the second moveable coupling stowing system may be omitted.

In an embodiment, the first moveable coupling locking system on the base portion manipulation mechanism 200 provides a lockable joint mechanism with multiple rotational degrees of freedom when unlocked/released (e.g., using the locking actuator 210 that is illustrated herein as a lever arm) and, when frictionally engaged, substantially immobilizes rotation about the lockable joint to fix the left- and right-side keyboard segments in any of a variety of tented, splayed or tented and splayed relative positions or orientations. Some aspects of lockable joint mechanism that shares some common features with that described herein may be found in commonly-owned, U.S. patent application Ser. No. 13/300, 150, filed Nov. 18, 2011, entitled "ADJUSTABLE ERGONOMIC KEYBOARD" and naming Linegar and Norwalk as inventors, the entirety of which is incorporated by reference.

Additional aspects and improvements to the input system 100 are provided using a fold-over, dual-joint, hinge mechanism that is detailed herein and will be understood based on the present description relative to ergonomic keyboard embodiments disclosed herein and in the incorporated prior application. More specifically, embodiments of an adjustable ergonomic keyboard are described that include a releasable latch that facilitates retention of a second hinge joint in an immobilized position for keyboard use and tent/splaying adjustments, and that also allows a fold-over manipulation of the keyboard segments. Fold over manipulation and structures and/or mechanisms to so support will be understood based on further description and drawings herein.

Figure 3A:
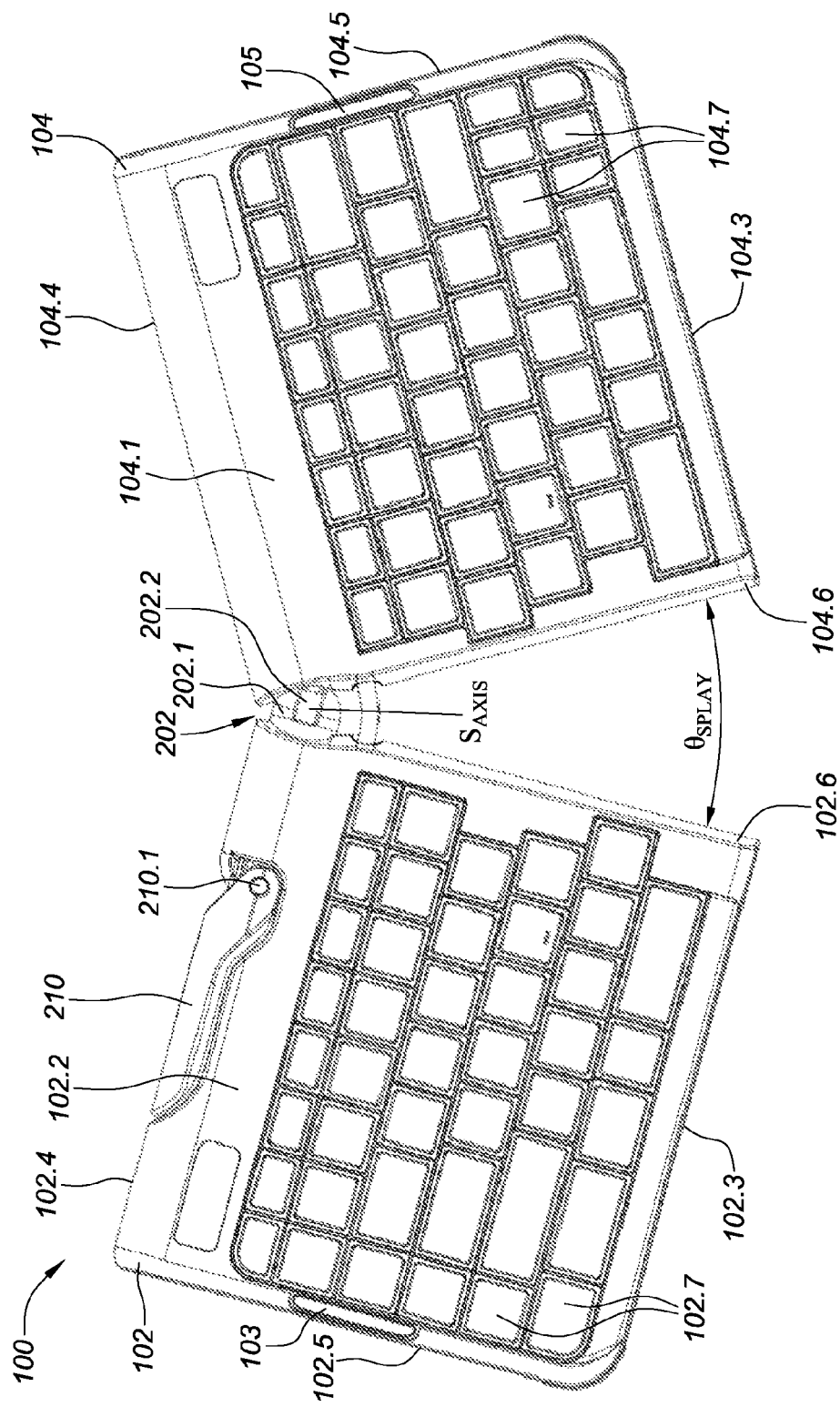
FIG. 3A is a top view illustrating an embodiment of the keyboard input system FIGS. 1 and 2 with the first and second portions in a splayed orientation.
Figure 3B:
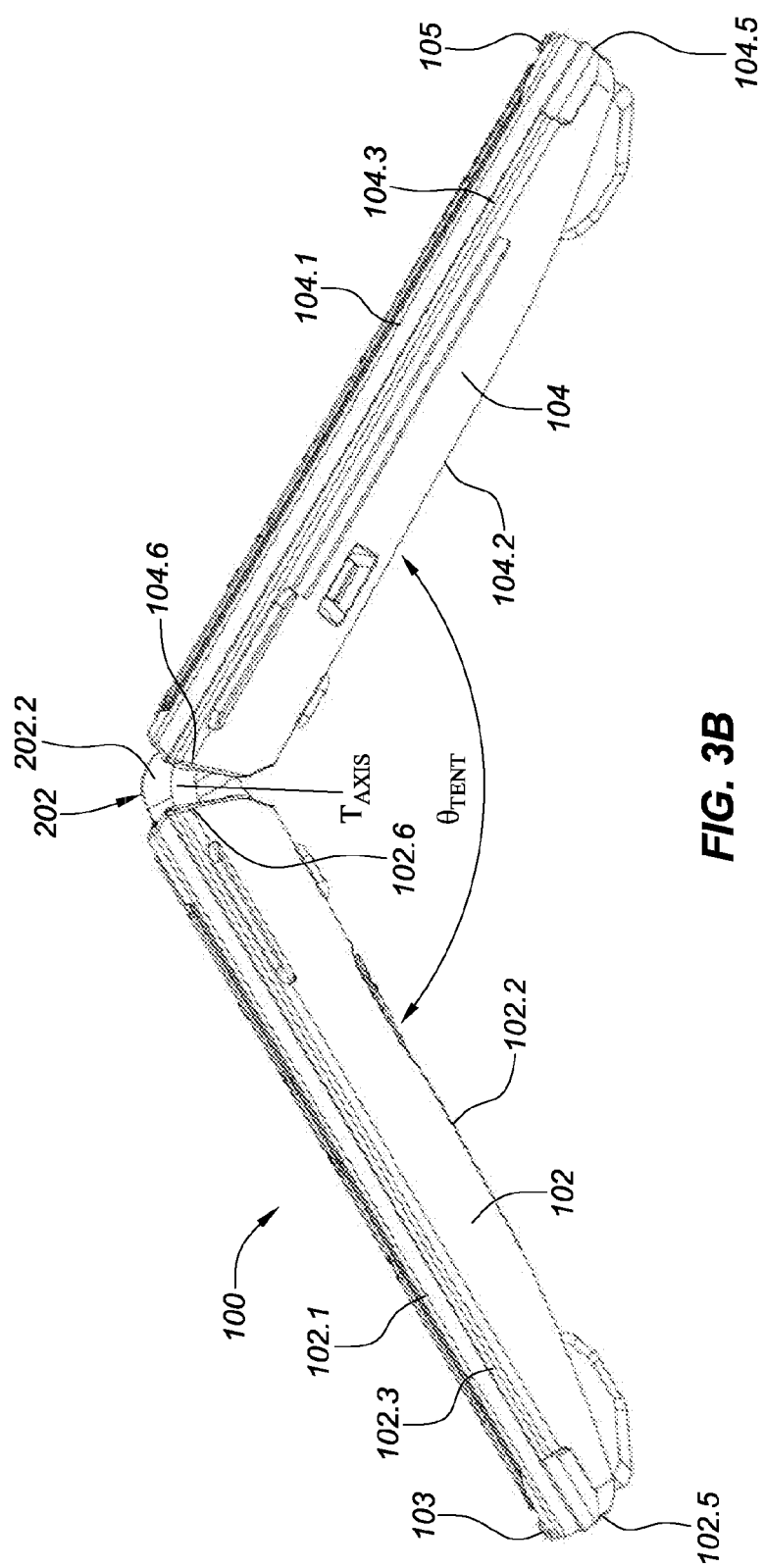
FIG. 3B is a front view illustrating an embodiment of the keyboard input system of FIGS. 1 and 2 with the first and second portions in a tented orientation.
Figure 4:
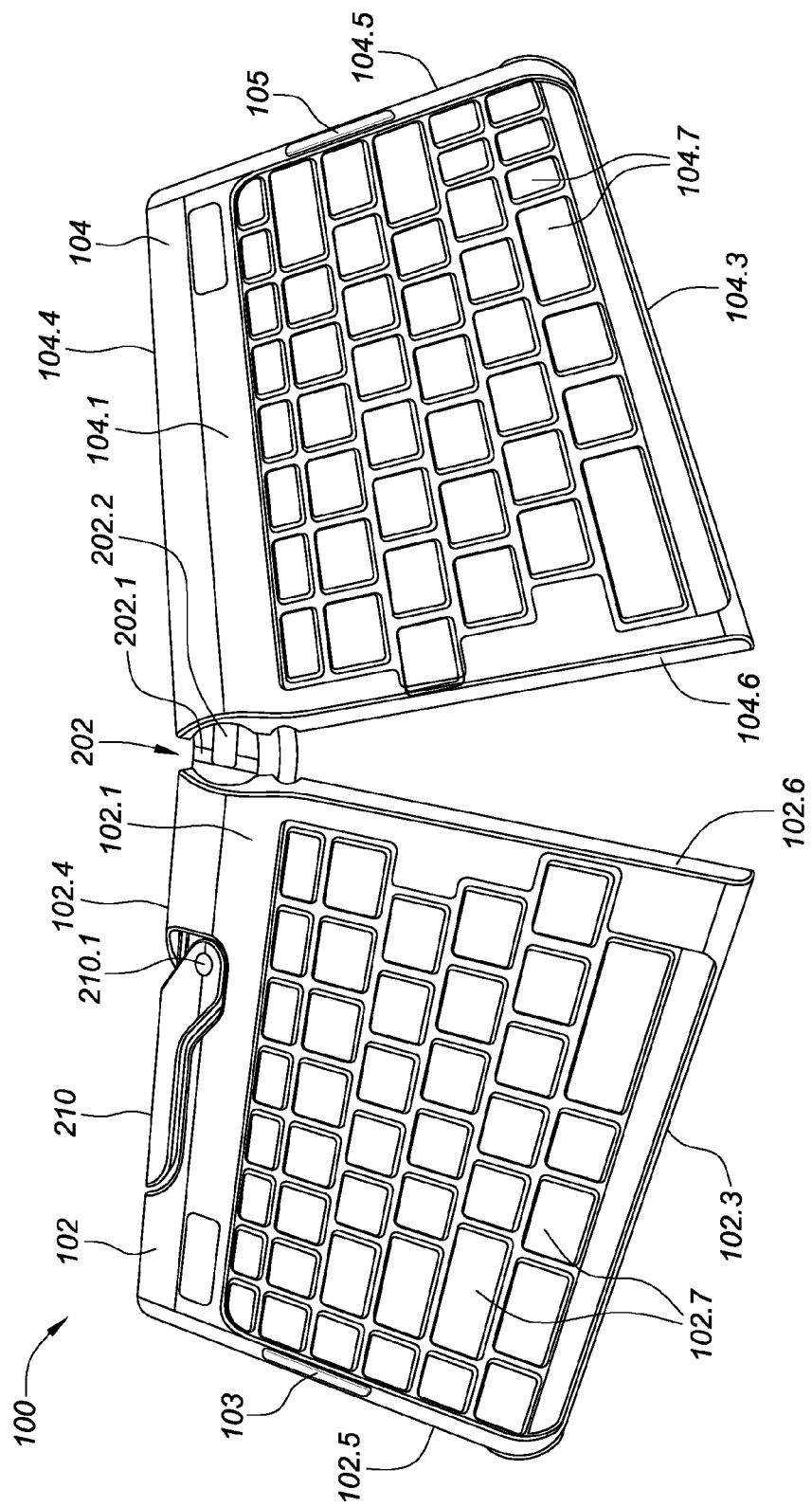
FIG. 4 is a perspective view illustrating an embodiment of the keyboard input system of FIGS. 1 and 2 with the first and second portions in a tented and splayed orientation.

Referring now to FIGS. 3A, 3B, and 4, embodiments of tented, splayed, and tented and splayed orientations for the input system 100 are illustrated. FIG. 3A illustrates an embodiment of how the first rotational coupling 202 provides for a splaying range of motion $\Theta_{SPLAY}$ by allowing relative movement of the first base portion 102 and the second base portion 104 about a splaying axis $S_{AXIS}$ that coincides with the rotational axis of the ball 202.1 in the socket 202.2 and that comes out of the page of the drawing illustrated in FIG. 3A. Thus, from the unsplayed orientation illustrated in FIG. 1, the first base portion 102 and the second base portion 104 may be moved relative to each other about the splaying axis $S_{AXIS}$ such that the first base portion 102 and the second base portion 104 are provided in the splayed orientation illustrated in FIG. 3A. FIG. 3B illustrates an embodiment of how the first rotational coupling 202 also provides for a tenting range of motion $\Theta_{TENT}$ by allowing relative movement of the first base portion 102 and the second base portion 104 about a tenting axis $T_{AXIS}$ that coincides with the rotational axis of the ball (not visible in FIG. 3B) in the socket 202.2 and that comes out of the page of the drawing illustrated in FIG. 3B. Thus, from the flat or untented orientation illustrated in FIG. 1 (e.g., when the top surface 102.1 of the first base portion 102 is substantially co-planar with the top surface 104.1 of the second base portion 104), the first base portion 102 and the second base portion 104 may be moved relative to each other about the tenting axis $T_{AXIS}$ such that the first base portion 102 and the second base portion 104 are provided in the tented orientation illustrated in FIG. 3B.

As discussed above, the first moveable coupling 202 provides for relative movement of the first base portion 102 and the second base portion 104 into a variety of tented and splayed orientations, such as the tented and splayed orientation illustrated in FIG. 4, and one of skill in the art will recognize that the splaying range of motion $\Theta_{SPLAY}$ and the tenting range of motion $\Theta_{TENT}$ illustrated in FIGS. 3a and 3b provide for those varieties of tented and splayed orientations such that the input system 100 may be positioned ergonomically for a wide variety of users. For example, the splaying range of motion $\Theta_{SPLAY}$ between an the unsplayed orientation and a fully splayed orientation (e.g., to the limits of the first moveable coupling) may be approximately 20 degrees, while the tenting range of motion $\ominus_{TENT}$ between an untented orientation and a fully tented orientation (e.g., to the limits of the first moveable coupling) may be approximately 40 degrees. As also discussed above, the first moveable coupling 202 may be locked in any of the tented, splayed, or tented and splayed orientation provided by the first moveable coupling such that any movement of the first base portion 102 and the second base portion 104 relative to each other about the first moveable coupling is resisted.

For example, in order to provide the first base portion 102 and the second base portion 104 in a desired tented, splayed, or tented and splayed orientation, the locking actuator 210 may be deactuated by rotating the locking actuator 210 about the axis 210.1 and away from the top edge 102.4 of the first base portion 102. Such movement of the locking actuator 210 causes the cam surface 210.2 on the locking actuator 210 to reduce the force on the locking piston 208.1 such that frictional engagement of the frictional member 208.2 with the ball 202.1 (and/or the ball 202.1 with the socket 202.2) is reduced to a level that allows the ball 202.1 to rotate in the socket 202.2. This allows the first base portion 102 and the second base portion 104 to be moved relative to each other about the first moveable coupling 202 and into a desired tented, splayed, or tented and splayed orientation. The locking actuator 210 may then be actuated by rotating the locking actuator 210 about the axis 210.1 and towards the top edge 102.4 of the first base portion 102. Such movement of the locking actuator 210 causes the cam surface 210.2 on the locking actuator 210 to increase the force on the locking piston 208.1 such that frictional engagement of the frictional member 208.2 with the ball 202.1 (and/or the ball 202.1 with the socket 202.2) is increased to a level that resists the ball 202.1 from rotating in the socket 202.2, thus locking the first base portion 102 and the second base portion 104 in the desired tented, splayed, or tented and splayed orientation.

Referring now to FIGS. 5, 6A, 6B, 6C, 6D, 6E, 6F and 6G, an embodiment of a method 500 for providing an input system is illustrates that describes a sequence of manipulations and configuration changes for the input system introduced in FIGS. 1 and 2 that allow a user to transition the input system from a side-by-side, deployed configuration to a folded over or stacked configuration that is suitable for travel or storage. Specifically, in the illustrated folded over or stacked configuration of FIG. 6G, a protective clamshell is provided for the input devices (e.g., keys, touch devices, and/or displays on the first base portion 102 and the second base portion 104), while providing access to the releasable ball-and-socket joint and releasable latch mechanisms that facilitate user manipulations.

Figure 6A:
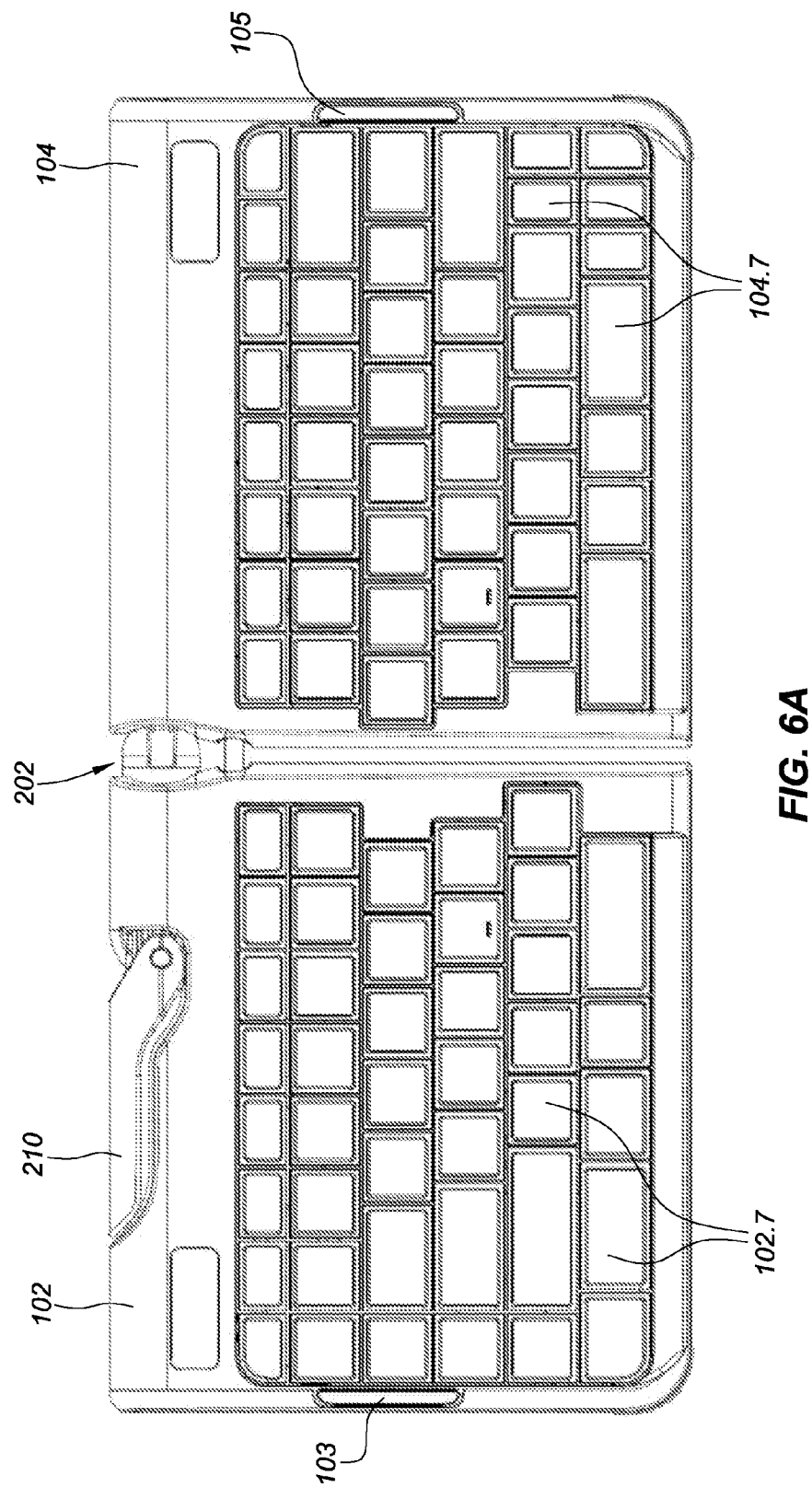
FIG. 6A is a top view illustrating an embodiment of the keyboard input system of FIGS. 1 and 2 with the first and second portions in an unfolded or unstacked orientation, an untented orientation, and an unsplayed orientation.

Referring now to FIGS. 5 and 6A, the method 500 begins at block 502 where the input system 100 with the first based portion 102 and the second base portion 104 are provided in a side-by-side orientation. The first base portion 102 and the second base portion 104 may be provided in a variety of different side-by-side orientations in which the input device(s) on the first base portion 102 and the second base portion 104 are presented to a user for keyboarding. For example, an untented and unsplayed side-by-side orientation is illustrated in FIGS. 1 and 6A in which the first base portion 102 and the second base portion 104 are positioned side-by-side with the inner side edges 102.5 and 104.5 adjacent and substantially parallel, and with the top surfaces 102.1 and 104.1 substantially coplanar. In some embodiments, the untented and unsplayed side-by-side orientation may be provided subsequent to the first base portion 102 and the second base portion 104 being in a tented orientation, a splayed orientation, or a tented and splayed orientation by, for example, releasing the first moveable coupling locking system such that relative movement of the first base portion 102 and the second base portion 104 about the first moveable coupling is allowed, and then positioning the first base portion 102 relative to the second base portion 104 in the untented and unsplayed side-by-side orientation.

In another example, a splayed side-by-side orientation is illustrated in FIG. 3A in which the first base portion 102 and the second base portion 104 are positioned side-by-side with the inner side edges 102.5 and 104.5 non-parallel and at an angle ($\ominus_{SPLAY}$) to each other, and with the top surfaces 102.1 and 104.1 substantially coplanar. In another example, a tented side-by-side orientation is illustrated in FIG. 3B in which the first base portion 102 and the second base portion 104 are positioned side-by-side with the inner side edges 102.5 and 104.5 substantially parallel, and with the top surfaces 102.1 and 104.1 at an angle ($\ominus_{TENT}$) to each other. In another example, a tented and splayed side-by-side orientation is illustrated in FIG. 4 in which the first base portion 102 and the second base portion 104 are positioned side-by-side with the inner side edges 102.5 and 104.5 non-parallel and at an angle (similar to $\ominus_{SPLAY}$, illustrated in FIG. 3A) to each other, and with the top surfaces 102.1 and 104.1 at an angle (similar to $\ominus_{TENT}$, illustrated in FIG. 3B) to each other. One of skill in the art will recognize that the input system 100 may provide optimal ergonomic function for a user by providing the tented and splayed side-by-side orientation illustrated in FIG. 4 according to the specific requirements and/or needs of that user.

Figure 7A:
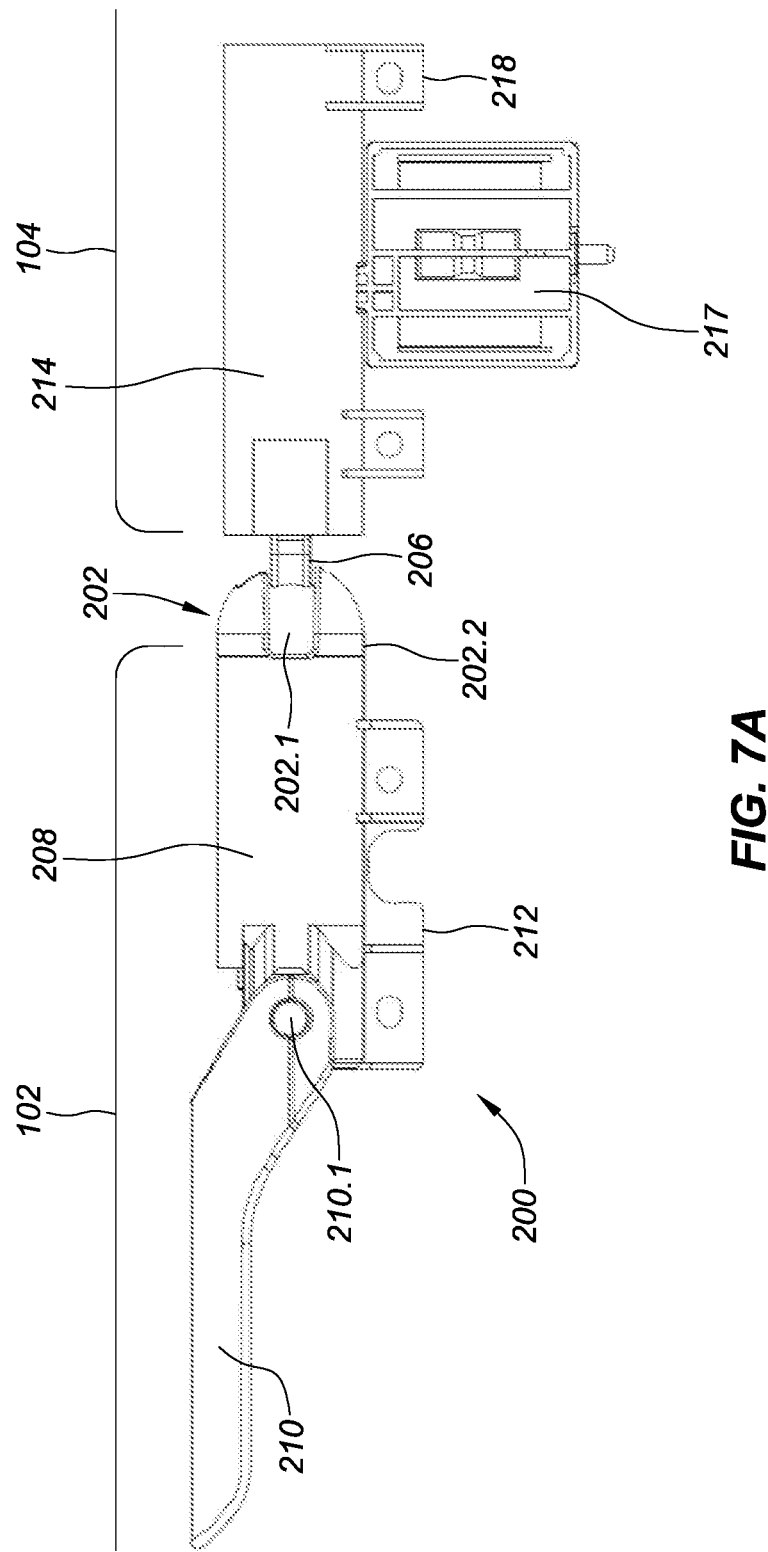
FIG. 7A is a side view illustrating an embodiment of the manipulation mechanism used with the keyboard input system of FIGS. 1 and 2, including a hinge coupling in a stowed position.
Figure 7B:
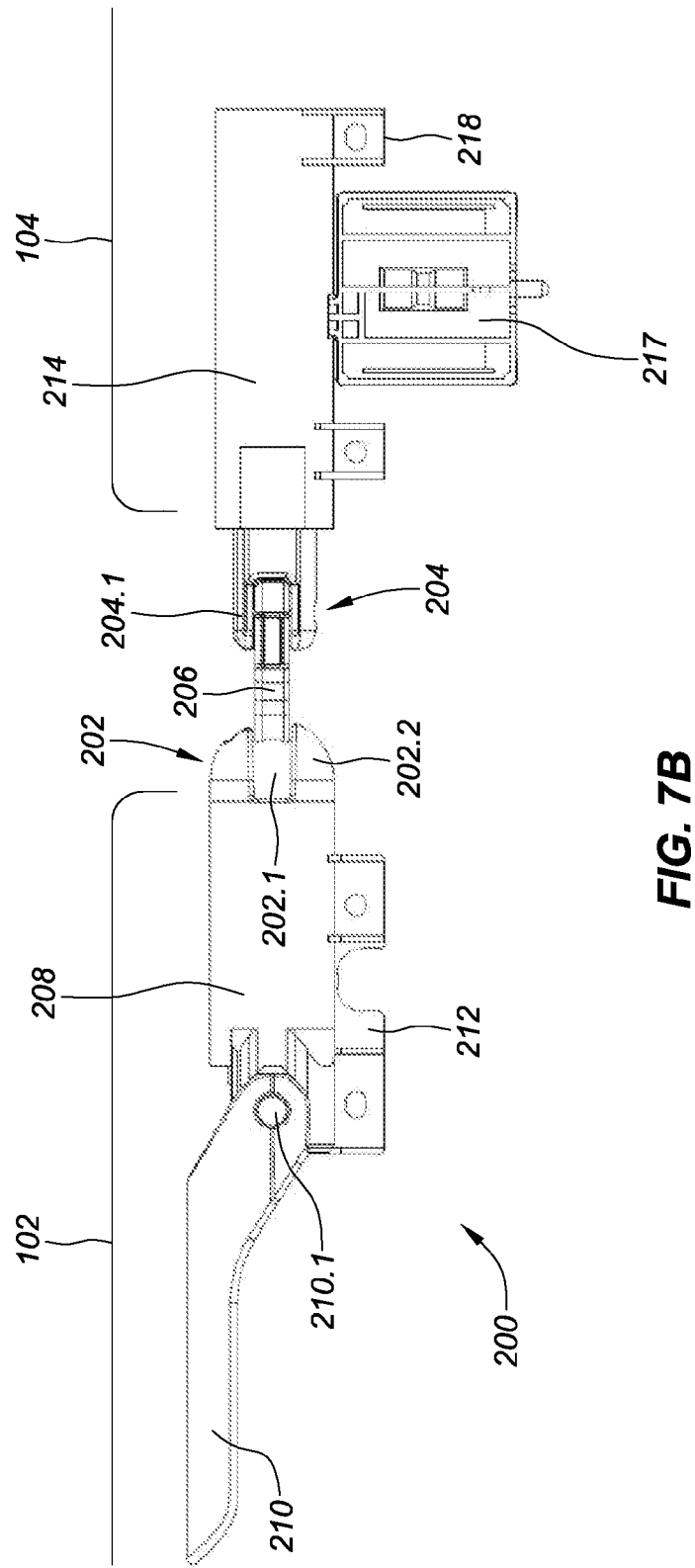
FIG. 7B is a side view of an embodiment of the manipulation mechanism of FIG. 7A with the hinge coupling in an extended position.
Figure 7C:
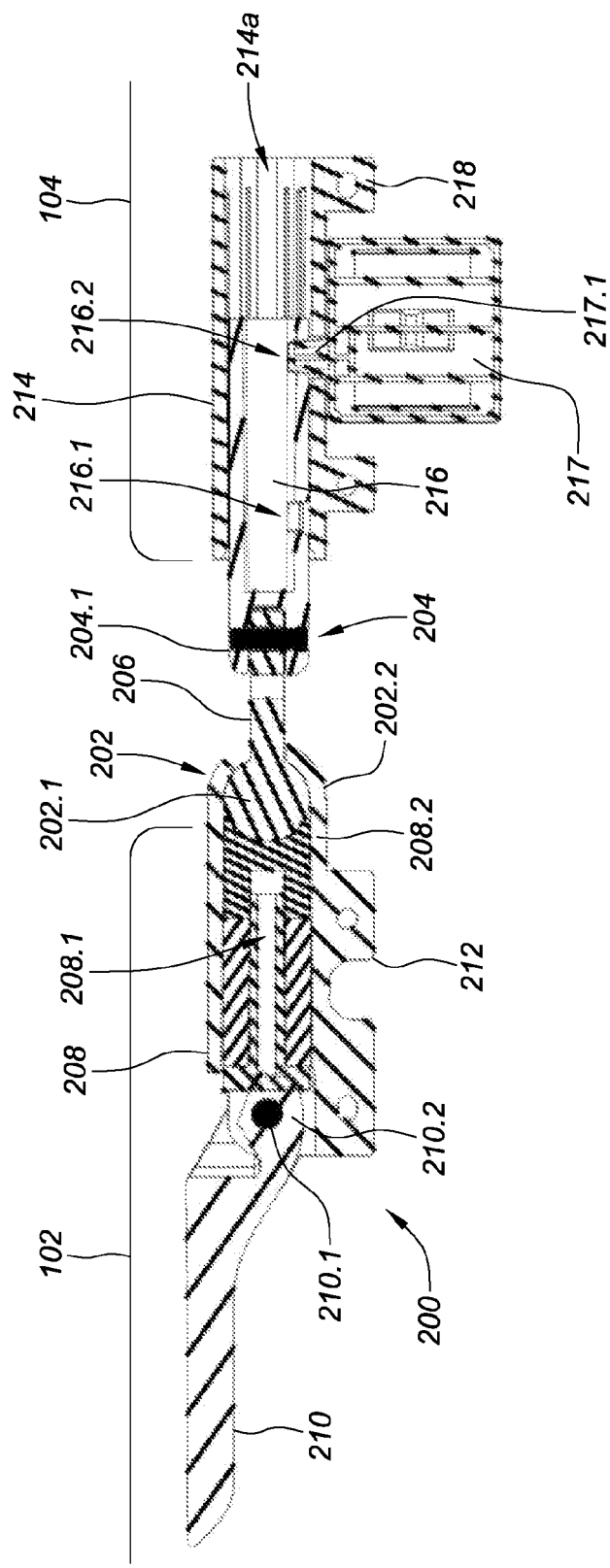
FIG. 7C is a cross-sectional view illustrating an embodiment of the manipulation mechanism of FIG. 7B with the hinge coupling in the extended position.
Figure 7D:
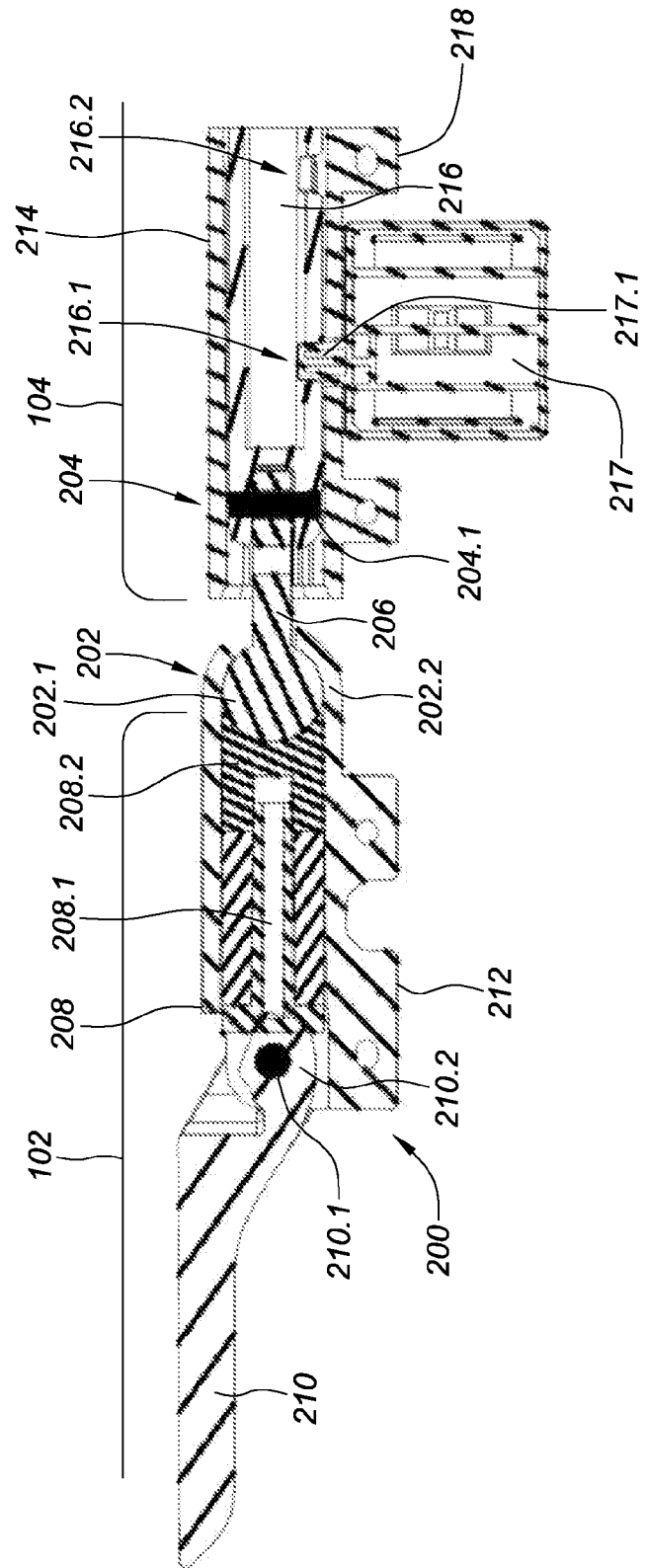
FIG. 7D is a cross-sectional view illustrating an embodiment of the manipulation mechanism of FIG. 7A with the hinge coupling in the stowed position

In the embodiment illustrated in FIG. 6A, the side-by-side orientation provides the locking actuator 210 in a locked position such that movement of the first base portion 102 relative to the second base portion 104 about the first moveable coupling 202 is resisted (e.g., through frictional engagement between the frictional member 208.2 and the ball 202.1 (and/or the ball 202.1 and the socket 202.2)), with the second moveable coupling 204 in a stowed position within the channel 214a defined by the stowing housing 214, as also illustrated in FIGS. 7A and 7D. As illustrated in FIG. 7D, in the stowed position, the locking member 217.1 on the locking system 217 is positioned in the locking aperture 216.1 to resist movement of the second moveable coupling 204 out of the channel 214a. Furthermore, the second moveable coupling 204 may be immobilized when located in the channel 214a, as movement of the first base portion 102 and the second base portion 104 about the second moveable coupling 204 is resisted due to the inability of the link 206 to rotate about the pivotal connection 204.1 due to being constrained by the walls of the stowing housing 214.

Figure 6B:
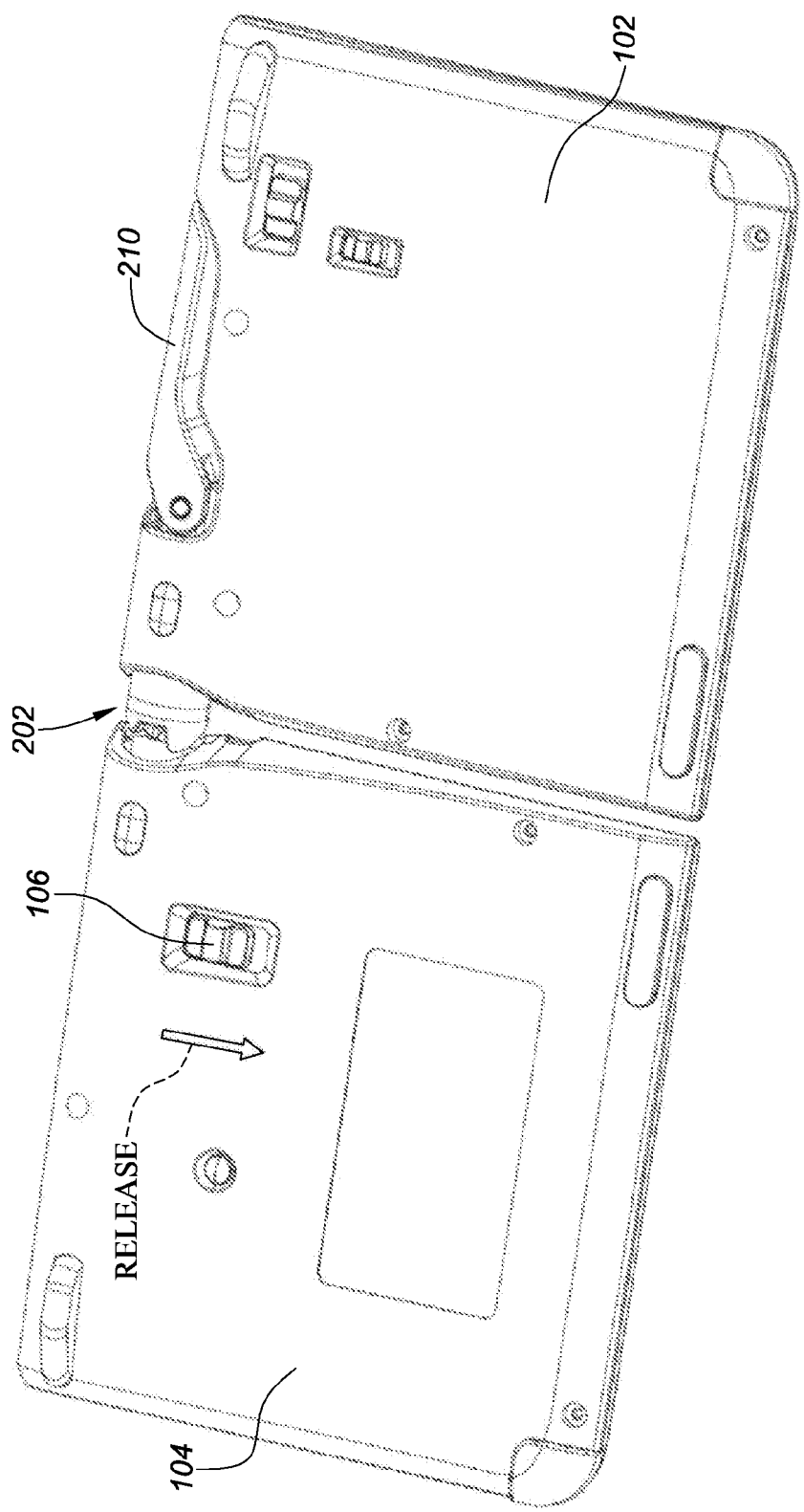
FIG. 6B is a bottom view illustrating an embodiment of the keyboard input system of FIGS. 1 and 2, an in particular, the release of a latch to allow a hinge coupling on the manipulation mechanism to extend from one of the first and second portions.

Referring now to FIGS. 5 and 6B, the method 500 then proceeds to block 504 where the second moveable coupling 202 is released. In the illustrated embodiment, a user may actuate the second moveable coupling lock release member 106 (e.g., in the RELEASE direction illustrated in FIG. 6B) to move the locking system 217 such that the locking member 217.1 moves out of the locking aperture 216.1 (see FIGS. 7C and 7D.) Moving the locking member 217.1 out of the locking aperture 216.1 frees the base 216 to move relative to the stowing housing 214 and through the channel 214a.

Figure 6C:
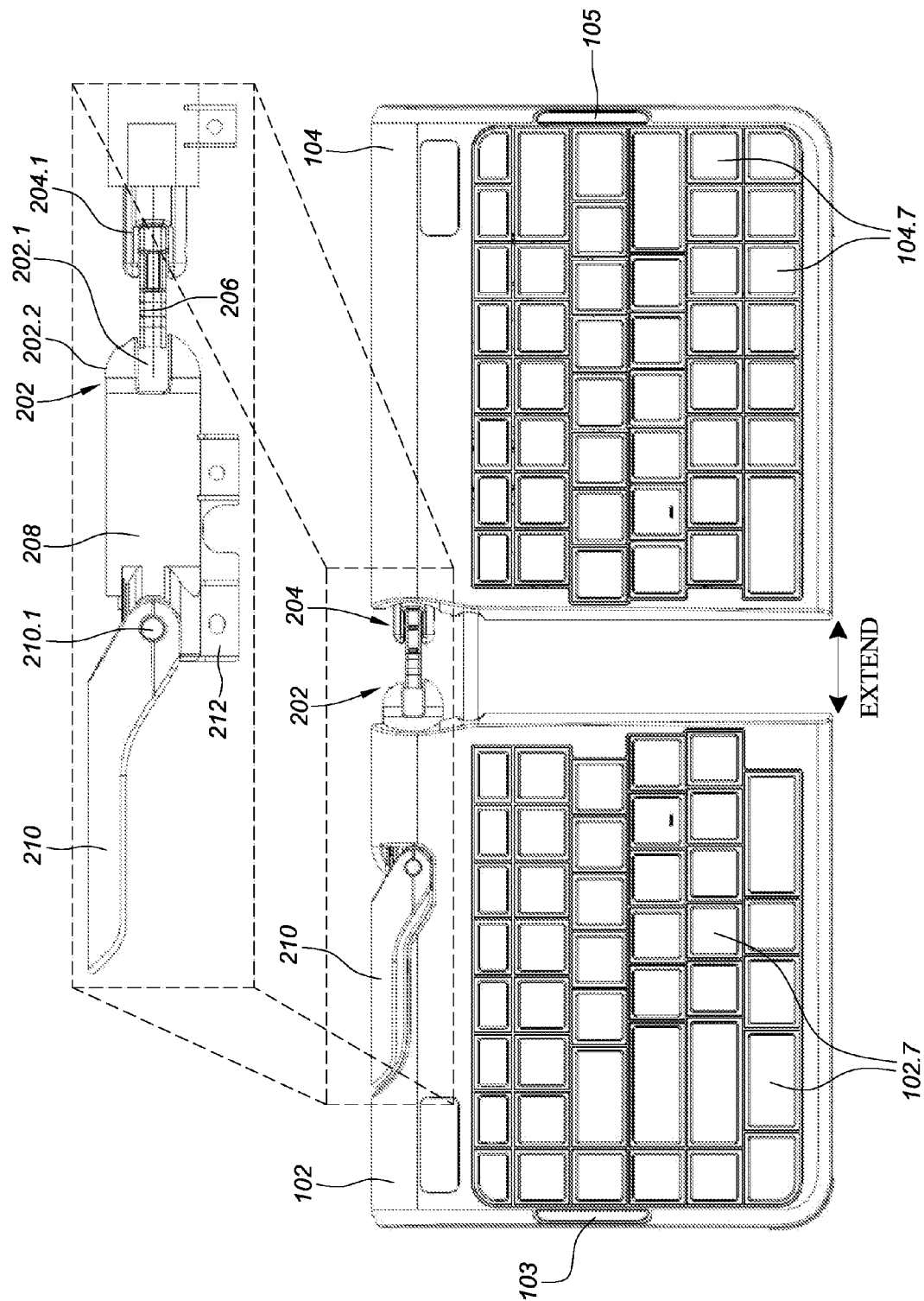
FIG. 6C is a top view illustrating an embodiment of the keyboard input system of FIGS. 1 and 2 including a hinge coupling on the manipulation mechanism extended from one of the first and second portions.

Referring now to FIGS. 5 and 6C, the method 500 then proceeds to block 506 where the second moveable coupling 204 is extended from the second base portion 104. With the base 216 free to move relative to the stowing housing 214 and through the channel 214a (see FIGS. 7C and 7D), the first base portion 102 and the second base portion 104 may be moved relative to each other and away from each other (e.g., in the EXTEND direction illustrated in FIG. 6C) such that the second moveable coupling 204 extends out of the channel 214a defined by the stowing housing 214, also illustrated in FIGS. 7B and 7C. As can be seen in FIG. 7C, movement of the base 216 relative to the stowing housing 214 and through the channel 214a to cause the second moveable coupling 204 to extend from the channel 214a causes the locking member 217.1 on the locking system 217 to be biased into the locking aperture 216.2. Positioning of the locking member 217.1 in the locking aperture 216.2 secures the second moveable coupling 204 in the extended position out of the channel 214a and resists movement of the second moveable coupling 204 back into the channel 214a. However, a user may position the second moveable coupling 204 back in the channel 214a by actuating the second moveable coupling lock release member 106 such that the locking member 217.1 moves out of the locking aperture 216.2, and then moving the base 216 and second moveable coupling 204 relative to the stowing housing 214 and back into the channel 214a.

Figure 6D:
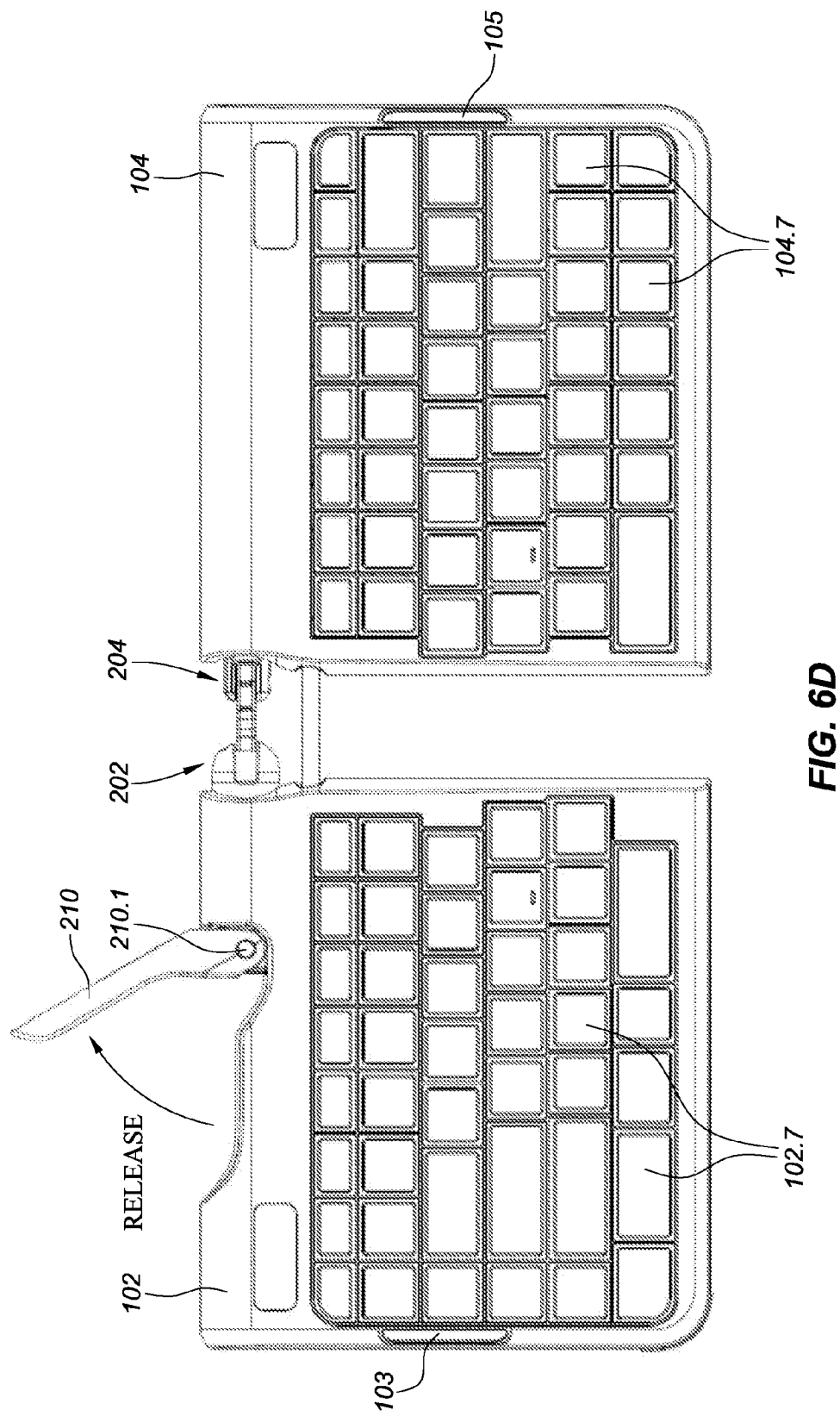
FIG. 6D is a top view illustrating an embodiment of the keyboard input system of FIGS. 1 and 2 including the release of a locking system to allow movement of a ball and socket coupling on the manipulation mechanism.

Referring now to FIGS. 5 and 6D, the method 500 then proceeds to block 508 where the first moveable coupling 202 is released. As discussed above, in the illustrated embodiment, the initial side-by-side orientation provides the locking actuator 210 in a locked position such that movement of the first base portion 102 relative to the second base portion 104 about the second moveable coupling 202 is resisted (e.g., through frictional engagement between the frictional member 208.2 and the ball 202.1 (and/or the ball 202.1 and the socket 202.2)). At block 508, the locking actuator 210 is moved about the axis 210.1 and away from the rear edge 102.4 of the first base portion 102 (e.g., in the RELEASE direction illustrated in FIG. 6D) such that the cam surface 210.2 on the locking actuator 210 reduces the force on the locking piston 208.1 such that frictional engagement of the frictional member 208.2 with the ball 202.1 (and/or the ball 202.1 and the socket 202.2) is reduced to a level that allows the ball 202.1 to rotate in the socket 202.2.

Figure 6E:
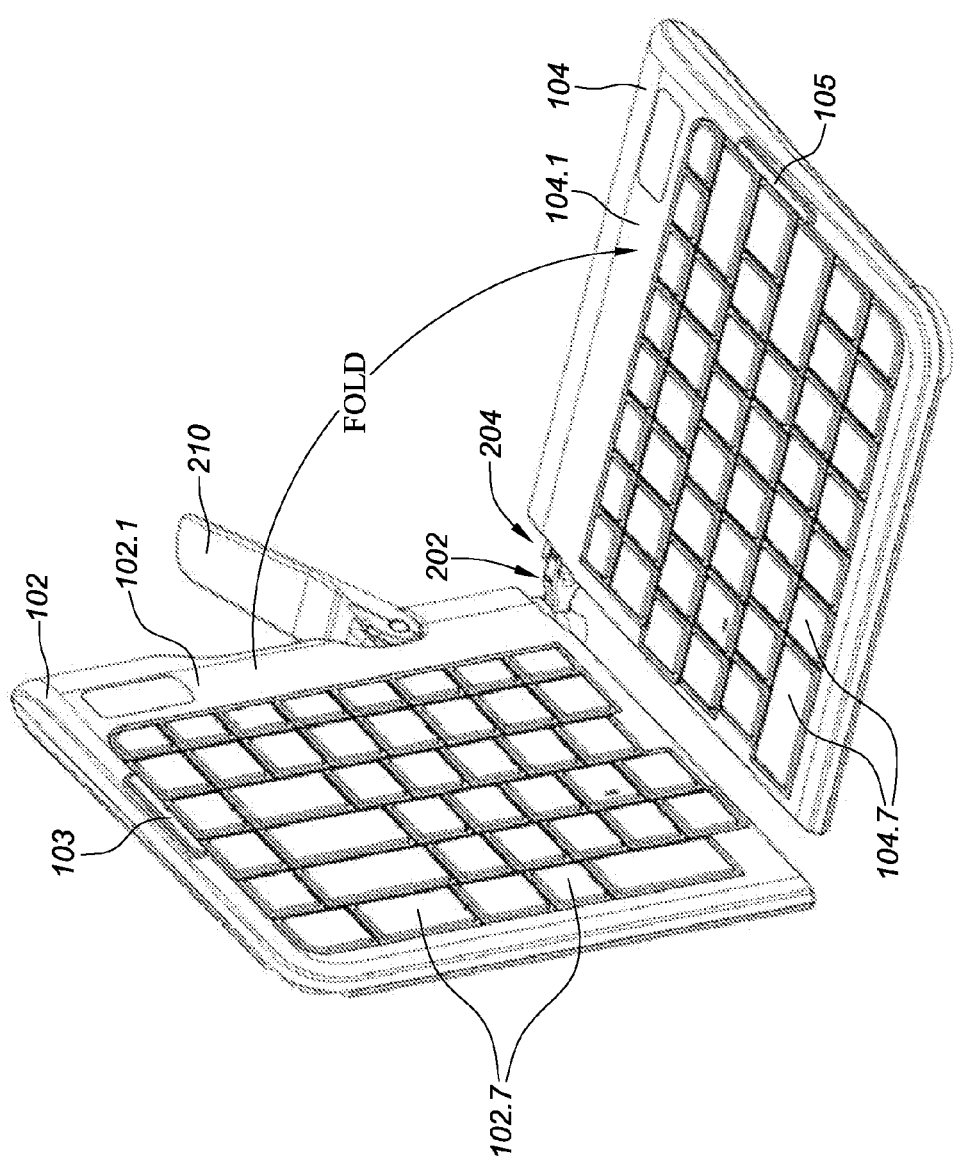
FIG. 6E is a perspective view illustrating an embodiment of the keyboard input system of FIGS. 1 and 2 including the first and second portions moving relative to each other and into a folded or stacked orientation.
Figure 6F:
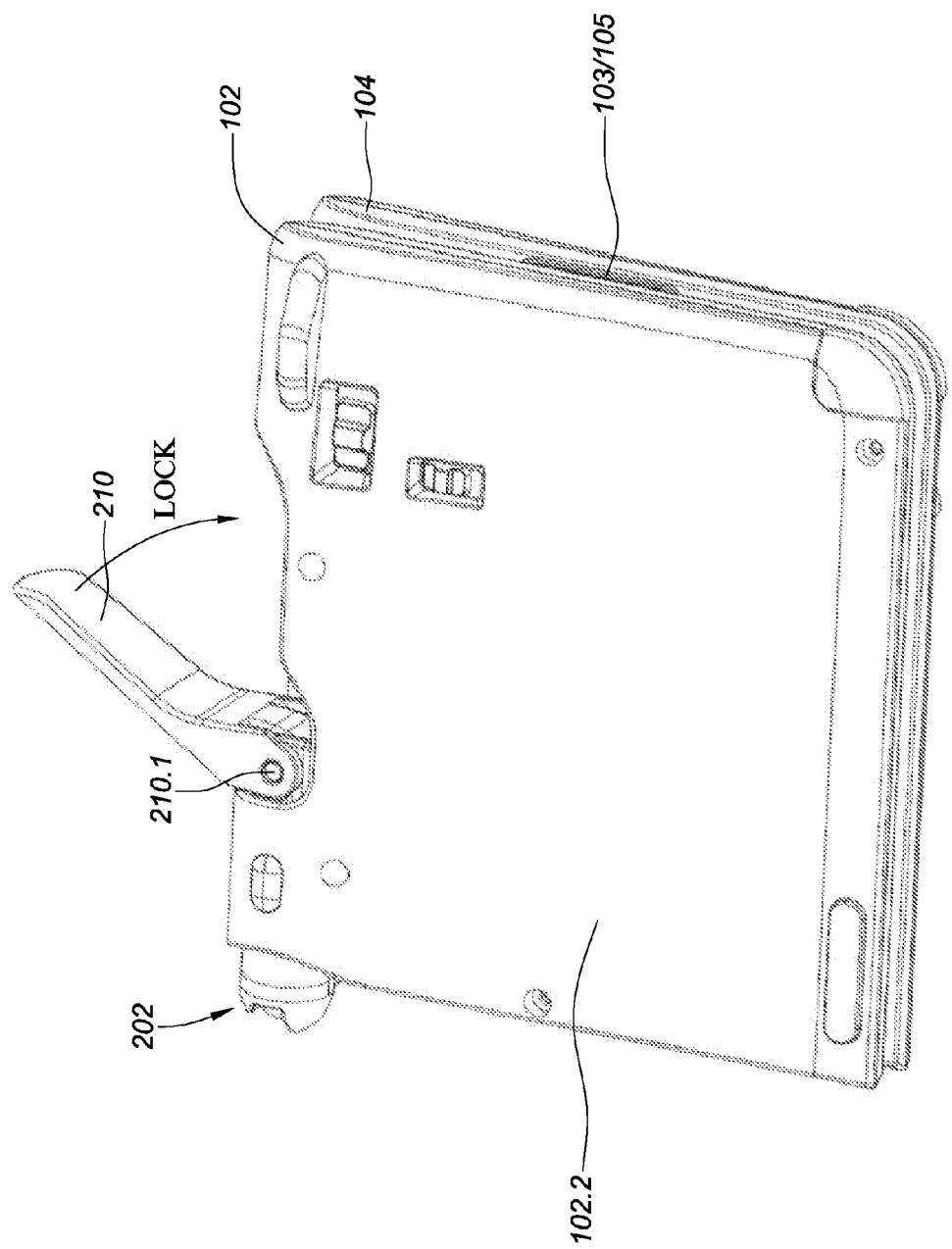
FIG. 6F is a perspective view illustrating an embodiment of the keyboard input system of FIGS. 1 and 2 with the first and second portions being locked in a folded or stacked orientation.

Referring now to FIGS. 5, 6E, and 6F, the method 500 then proceeds to block 510 where the first base portion 102 is moved relative to the second base portion 104 and into a folded or stacked orientation. With the second moveable coupling 204 extended from the second base portion 104, and the first moveable coupling 102 released at block 508, the first base portion 102 may first be moved relative to the second base portion 104 (e.g., about the FOLD direction illustrated in FIG. 6E) until the top surface 102.1 on the first base portion 102 is located immediately adjacent the top surface 104.1 on the second base portion 104, as illustrated in FIG. 6F. In an embodiment, movement of the first base portion 102 relative to the second base portion 104 at block 510 includes movement about the first moveable coupling 202 and movement about the second moveable coupling 204. For example, the first base portion 102 may also rotate relative to the second base portion 104 by approximately 90 degrees about a first folding/stacking axis provided by the first moveable coupling 202, and the first base portion 102 may rotate relative to the second base portion 104 by approximately 90 degrees about a second folding/stacking axis provided by the second moveable coupling 204, to provide approximately 180 degrees of rotation between the side-by-side orientation and the folded or stacked orientation. However, one of skill in the art will recognize that movement of the first base portion 102 relative to the second base portion 104 and about the first moveable coupling 202 and the second moveable coupling 206 may vary from that discussed above while still remaining within the scope of the present disclosure to provide the first base portion 102 and the second base portion 104 in the folded or stacked orientation.

As illustrated, the folded or stacked orientation provides the first base portion 102 and the second base portion 104 folded relative to their side-by-side orientation in which the input devices 102.7 and 104.7 are presented to a user, and stacked, one on top of the other, to provide a compact size for the input system 100. In the illustrated embodiment, the folded and stacked orientation provides the top surfaces 102.1 and 104.1, and thus the input devices 102.7 and 104.7, facing each other and protected by the bottom surfaces 102.2 and 104.2 in a clamshell configuration. As discussed above, the mating surface 103 on the first base portion 102 and the mating surface 105 on the second base portion 104 may engage each other when the first base portion 102 and the second base portion 104 are in the folded or stacked orientation to prevent input device events causes by, for example, depressing of keys. Furthermore, as discussed above, the mating surface 103 and/or the mating surface 105 may be provided by features that further provide a folded/stacked orientation securing system that resists relative movement of the first base portion 102 and the second base portion 104 when in the folded or stacked orientation. For example, the features that provide the mating surfaces 103 and 105 may include latch features, magnets, an or other catch system devices that secure to each other and resist the unfolding of the stacked first base portion 102 and second base portion 104.

Referring now to FIGS. 5, 6F and 6G, the method 500 then proceeds to block 512 where the first moveable coupling 202 is locked. The locking actuator 210 is moved about the axis 210.1 (e.g., in the LOCK direction illustrated in FIG. 6F) and towards the top edge 102.4 of the first base portion 102 to cause the cam surface 210.2 on the locking actuator 210 to increase the force on the locking piston 208.1 such that frictional engagement of the frictional member 208.2 with the ball 202.1 (and/or the ball 202.1 with the socket 202.2) is increased to a level that resists the ball 202.1 from rotating in the socket 202.2. Locking of the first moveable coupling 202 resists movement of the first base portion 102 relative to the second base portion 104 such that they remain in the folded or stacked configuration.

Referring now to FIGS. 8A, 8B and 8C, embodiments of the first moveable coupling as a lockable ball-and-socket joint mechanism 300 are illustrated. These embodiments are but one of a variety of first moveable coupling mechanisms that support, in addition to tenting and splaying manipulations, rotational degrees of freedom (e.g., in a ball-and-socket joint) that facilitate the aforementioned fold-over operations. Specifically, FIGS. 8A and 8C provide the above discussed functionality by providing the link 206 through a motion constraining window 302 defined by the socket 202.2 (see FIG. 8B) that is configured to restrict rotational freedom in a manner consistent with desired operations and manipulations described and illustrated herein.

The lockable ball-and-socket joint mechanism 300 is described above with reference to the first rotational coupling 202 and associated locking system, and similar reference numbers are used for similar features. FIGS. 8A and 8C provide opposing sides of the lockable ball-and-socket joint mechanism 300, while FIG. 8B provides a front view of the lockable ball-and-socket joint mechanism 300 with the link 206 removed. Viewed in combination, FIGS. 8A, 8B, and 8C show the motion constraining window 302 defined by the socket 202.2 that provides the range of motion discussed above to enable the tented, splayed, tented and splayed, and folded or stacked orientations of the first base portion 102 and the second base portion 104. Specifically, FIGS. 8A and 8B illustrate a folding portion 302.1 of the motion constraining window 302 that is configured to allow the link 206 to move in FOLD direction that restricts movement of the first base portion 102 relative to the second base portion 104 in a single plane about a single axis. Specifically, in the illustrated embodiment, the folding portion 302.1 of the window 302 is substantially the same width as the link, restricting the movement of the link 206 through the folding portion 302.1 of the window 302 is substantially one direction. Thus, in an embodiment, given the single plane/single axis rotation provided by the second moveable coupling 204 when the second moveable coupling 204 is a hinge, along with the single plane-single axis rotation provided by the folding portion 302.1 of the window 302, relative movement of the first base portion 102 and the second base portion 104 into the folded or stacked orientation may be constrained to a single rotational plane.

FIGS. 8B and 8C illustrated a tenting and splaying portion 302.2 of the motion constraining window 302 that is configured to allow the link 206 to move in the TENT and SPLAY directions that allow movement of the first base portion 102 relative to the second base portion 104 to provide the tented, splayed, and tented and splayed orientations discussed above. Specifically, in the illustrated embodiment, the tenting and splaying portion 302.2 of the window 300 begins as a stepped increase in the width of the window 302 following the end of the folding portion 302.1, with the tenting and splaying portion 302.2 of the window 300 then gradually reducing in width along a curve. Thus, while the second moveable coupling 204/hinge along with the folding portion 302.1 of the window 302 may operate to constrain relative movement of the first base portion 102 and the second base portion 104 to the folded or stacked orientation in a single rotational plane, once the link 206 leaves the folding portion 302.1 of the window 302 and enters the tenting and splaying portion 302.2 of the window 302, multiple rotational degrees of freedom are provided that allow relative movement unconstrained to a single rotational plane (e.g., tenting, splaying, or tenting and splaying.)

Thus, a system and method have been described that provide an input system that may be folded or stacked into a compact configuration for storage and/or travel, and then unfolded/unstacked and positioned in a tented orientation, a splayed orientation, or a tenting and splayed orientation for ergonomic use.

In some embodiments, the input system 100 includes input devices that are physical keys. However, because the input system 100 is limited in size to provide for compactness and portability, the number of physical keys is limited as well. In order to provide for full keyboard functionality with limited keys, one or more function keys are provided on the input system 100 to provide a key expansion function that allows at least a subset of the physical keys on the input system 100 to provide one than one input (e.g., with the key expansion function deactivated, a first key provides a first input, while with the key expansion function activated, that first key provides a second input that is different from the first input.) In one example, the input system 100 may include physical keys that input letters when the key expansion function is deactivated, while inputting numbers when the key expansion function is activated (e.g., a numeric keypad may be provided on a standard QWERTY keyboard such that the following alphanumeric keys provide the corresponding numbers when the key expansion function is activated: M=0, J=1, K=2, L=3, U=4, I=5, O=6, 7=7, 8=8, and 9=9).

In a specific embodiment, the input system 100 includes a Function key as well as a Number Lock key to provide a numeric keypad function that provides the numeric keypad using the standard QWERTY keyboard discussed above. For example, to active the numeric keypad function on the input system 100, a user first activates the Function key (e.g., by depressing the Function key) and then selects the Number Lock key (e.g., by depressing the Number Lock key). Following activation of the numeric keypad function, the input system 100 gives the user two options to deactivate the numeric keypad function: (1) the user may deactivate the numeric keypad function by deactivating the Function key (e.g., by depressing the Function key), or (2) the user may deactivate the numeric keypad function by deactivating the Number Lock key (e.g., by depressing the Number Lock key). Following deactivation of the numeric keypad function, the input system 100 gives the user two options to reactivate the numeric keypad function: (1) the user may reactivate the numeric keypad function by reactivating the Function key (e.g., by depressing the Function key), or (2) the user may reactivate the numeric keypad function by reactivating the Number Lock key (e.g., by depressing the Number Lock key.) Thus, the input system 100 provides the user with multiple options for switching between physical key functions quickly and easily, which allows less physical keys to be used while providing the same functionality, thereby increasing compactness and portability of the input system 100.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein

What is claimed is:

1. A keyboard comprising:
    a first keyboard segment and a second keyboard segment, wherein each of the first keyboard segment and the second keyboard segment includes a keying surface; and
    a fold-over, dual-joint mechanism coupling the first keyboard segment to the second keyboard segment, the fold-over dual joint mechanism including a first rotational coupling providing multiple rotational degrees of freedom and a second rotational coupling that is substantially immobilized when in a stowed position within the first keyboard segment;
    wherein at least one tented orientation, at least one splayed orientation, and at least one tented and splayed orientation of the first and second keyboard segments is accommodated using the first rotational coupling, and
    wherein the first rotational coupling is frictionally lockable in the at least one tented orientation, the at least one splayed orientation, and at least one tented and splayed orientation.

2. The keyboard of claim 1,
    wherein the at least one tented orientation, the at least one splayed orientation, and the at least one tented and splayed orientation of the first and second keyboard segments and the frictional locking in the at least one tented orientation, the at least one splayed orientation, and the at least one tented and splayed orientation are accommodated with the second rotational coupling in the stowed position.

3. The keyboard of claim 1, wherein the first rotational coupling includes a ball and a socket and at least one of the ball and the socket is dimpled to increase static friction between the ball and the socket to provide the frictional locking.

4. The keyboard of claim 1, further comprising: a latch that is configured to retain the second rotational coupling in the stowed position, wherein upon release of the latch, the second rotational coupling is configured to travel out of the first keyboard segment and into an extended position that allows the second rotational coupling to rotate to provide the first keyboard segment folded over the second keyboard segment in a folded orientation.

5. The keyboard of claim 1, further comprising: a catch system including a first catch portion located on the first keyboard segment and a second catch portion located on the second keyboard segment, wherein the first catch portion and the second catch portion are configured to retain the first keyboard segment and the second keyboard segment in a folded orientation.

6. The keyboard of claim 5, wherein the first keyboard segment and the second keyboard segment in the folded orientation provide a clamshell configuration to protect the keying surface on each of the first keyboard segment and the second keyboard segment.

7. The keyboard of claim 5, further comprising: a mating surface defined on each of the first keyboard segment and the second keyboard segment, wherein the keying surface on each of the first keyboard segment and the second keyboard segment does not extend past the mating surfaces such that no input events are generated in the folded orientation.

8. The keyboard of claim 1, wherein the fold-over, dual joint mechanism is configured to allow the first keyboard segment to pivot approximately 180 degrees relative to the second keyboard segment from (i) a first position in which the keying surface on each of the first keyboard segment and the second keyboard segment are presented to a human user as an operable keyboard to (ii) a second position in which the keying surface on each of the first keyboard segment and the second keyboard segment are protected by a clamshell configuration provided by the first keyboard segment folded over the second keyboard segment.

9. The keyboard of claim 1, wherein the first rotational coupling includes a ball and a socket, and the keyboard further comprises: a releasable biasing mechanism that is configured to urge the ball against the socket and frictionally impede rotation of the ball relative to the socket.

10. The keyboard of claim 9, wherein the releasable biasing mechanism includes a handle and a cam that are configured, when in a locked orientation, to provide the urging of the ball against the socket, and when in an unlocked orientation, to release frictional engagement of the ball and the socket.

11. The keyboard of claim 1, wherein the fold-over, dual-joint mechanism includes the first rotational coupling spaced apart from the second rotational coupling to provide a spaced apart pair of rotational couplings.

12. The keyboard of claim 1, wherein the first rotational coupling includes a ball and socket joint.

13. The keyboard of claim 1, wherein the second rotational coupling includes a hinge.

14. The keyboard of claim 1, wherein the first keyboard segment includes a body portion defining a channel.

15. The keyboard of claim 14, wherein the second rotational coupling is substantially immobilized when in the stowed position that is within the channel defined by the body portion of the first keyboard segment.

16. A keyboard comprising:
a first keyboard segment and a second keyboard segment, wherein each of the first keyboard segment and the second keyboard segment includes a keying surface; and
a fold-over, dual-joint mechanism coupling the first keyboard segment to the second keyboard segment, the fold-over dual joint mechanism including a first rotational coupling providing multiple rotational degrees of freedom and a second rotational coupling that is substantially immobilized when in a stowed position within the first keyboard segment; and
a latch that is configured to retain the second rotational coupling in the stowed position, wherein upon release of the latch, the second rotational coupling is configured to travel out of the first keyboard segment and into an extended position that allows the second rotational coupling to rotate to provide the first keyboard segment folded over the second keyboard segment in a folded orientation;
wherein the latch is configured to retain the second rotational coupling in each of the stowed position and the extended position.

17. A keyboard comprising:
a first keyboard segment and a second keyboard segment, wherein each of the first keyboard segment and the second keyboard segment includes a keying surface; and
a fold-over, dual-joint mechanism coupling the first keyboard segment to the second keyboard segment, the fold-over dual joint mechanism including a first rotational coupling providing multiple rotational degrees of freedom and a second rotational coupling that is substantially immobilized when in a stowed position within the first keyboard segment;
wherein the fold-over, dual joint mechanism is configured to allow the first keyboard segment to pivot approximately 180 degrees relative to the second keyboard segment from (i) a first position in which the keying surface on each of the first keyboard segment and the second keyboard segment are presented to a human user as an operable keyboard to (ii) a second position in which the keying surface on each of the first keyboard segment and the second keyboard segment are protected by a clamshell configuration provided by the first keyboard segment folded over the second keyboard segment; and
wherein the pivoting of the first keyboard segment relative to the second keyboard segment from the first position to the second position constrains movement of both the first rotational coupling and the second rotational coupling to a single rotational plane.

18. The keyboard of claim 17, wherein the multiple rotational degrees of freedom provided by the first rotational coupling allow further pivoting in directions that are unconstrained to the single rotational plane and include pivoting of the first keyboard segment and second keyboard segment from a flat orientation to a fully tented orientation, and include pivoting of the first keyboard segment and the second keyboard segment from an unsplayed orientation to a fully splayed orientation.

19. The keyboard of claim 18,
wherein the first rotational coupling includes a ball and a socket, and a shaped window is defined in the socket that is configured to constrain the movement of the ball to the single rotational plane and constrain the multiple rotational degrees of freedom to limits associated with the fully tented orientation and the fully splayed orientation.

20. The keyboard of claim 18,
wherein a tenting range of motion provided between the flat orientation and the fully tented orientation of the first keyboard segment and the second keyboard segment is approximately 40 degrees.

21. The keyboard of claim 18,
wherein a splaying range of motion provided between the unsplayed orientation and the fully splayed orientation of the first keyboard segment and the second keyboard segment is approximately 20 degrees.

22. An input system, comprising:
a first base portion including a keying surface;
a second base portion including a keying surface; and
a base portion manipulation mechanism coupling the first base portion to the second base portion, wherein the base portion manipulation mechanism includes:
a first moveable coupling that is configured to allow relative movement of the first base portion and the second base portion into at least one of a side-by-side tented orientation and a side-by-side splayed orientation; and
a second moveable coupling that is configured to allow relative movement of the first base portion and the second base portion into a stacked orientation;
wherein one but not the other of the first and second moveable couplings includes a multiple rotational degrees of freedom joint; and
wherein the first moveable coupling includes a ball and a socket that are configured, with the first base portion and the second base portion positioned side-by-side, to allow relative movement of the first base portion and the second base portion about a tenting axis and into the side-by-side tented orientation, and to allow relative movement of the first base portion and the second base portion about a splaying axis and into the side-by-side splayed orientation.

23. The input system of claim 22,
wherein each of the keying surface on the first base portion and the keying surface on the second base portion include at least one of: a plurality of physical keys, a virtual keying surface that is operable to display a plurality of virtual keys, and a touch screen.

24. The input system of claim 22,
wherein the second moveable coupling includes a hinge that is configured to allow relative movement of the first base portion and the second base portion about a stacking axis and into the stacked orientation.

25. The input system of claim 24,
wherein the stacking axis is a first stacking axis;
wherein the first moveable coupling is configured to allow relative movement of the first base portion and the second base portion about a second stacking axis; and
wherein relative movement of the first base portion and the second base portion about the first stacking axis and the second stacking axis moves the first base portion and the second base portion into the stacked orientation.

26. The input system of claim 22, further comprising:
a first moveable coupling locking mechanism that is configured to resist movement of first moveable coupling to prevent relative movement of the first base portion and the second base portion out of the at least one of the side-by-side tented orientation and the side-by-side splayed orientation.

27. The input system of claim 22,
wherein the second moveable coupling is configured to be immobilized to resist relative movement of the first base portion and the second base portion into the stacked orientation.

28. The input system of claim 27,
wherein the second moveable coupling is configured to be immobilized by moving the second moveable coupling into a stowed position such that the second moveable coupling is located in a channel defined by one of the first base portion and the second base portion, and wherein the second moveable coupling is configured to be mobilized by moving the second moveable coupling into an extended position such that the second moveable coupling is located out of the channel.

29. The input system of claim 28, further comprising:
a second moveable coupling locking mechanism that is configured to resist movement of the second rotational coupling relative to the channel when the second moveable coupling is in at least one of the stowed position and the extended position.

30. The input system of claim 22, further comprising:
a stacked orientation securing mechanism that is configured to resist relative movement of the first base portion and the second base portion out of the stacked orientation.

31. The input system of claim 22, further comprising:
a mating surface on each of the first base portion and the second base portion that are configured, when the first base position and the second base portion are in the stacked orientation, to prevent activation of the keying surface on each of the first base portion and the second base portion.

32. The input system of claim 22,
wherein the first moveable coupling allows a plurality of side-by-side tenting orientations of the first base portion and the second base portion that provide a tenting range of motion, between an untented orientation and a fully tented orientation, of approximately 40 degrees.

33. The input system of claim 25, wherein the first moveable coupling allows a plurality of side-by-side splayed orientations of the first base portion and the second base portion that provide a splaying range of motion, between an unsplayed orientation and a fully splayed orientation, of approximately 20 degrees.

34. The input system of claim 22,
wherein the keying surface included on the first base portion is provided on a first base portion surface and the keying surface included on the second base portion is provided on a second base portion surface; and
wherein the first base portion surface is located immediately adjacent and facing the second base portion surface when the first base portion and the second base portion are in the stacked orientation.

* * * * *